United States Patent
Garlock

(10) Patent No.: US 11,249,558 B1
(45) Date of Patent: Feb. 15, 2022

(54) TWO-HANDED KEYSET, SYSTEM, AND METHODS OF MAKING AND USING THE KEYSET AND SYSTEM

(71) Applicant: Seth D. Garlock, Niantic, CT (US)

(72) Inventor: Seth D. Garlock, Niantic, CT (US)

( * ) Notice: Subject to any disclaimer, the term of this patent is extended or adjusted under 35 U.S.C. 154(b) by 0 days.

(21) Appl. No.: 17/132,873

(22) Filed: Dec. 23, 2020

Related U.S. Application Data

(60) Provisional application No. 62/953,673, filed on Dec. 26, 2019.

(51) Int. Cl.

| | |
|---|---|
| *G06F 3/02* | (2006.01) |
| *G09G 5/00* | (2006.01) |
| *G06F 3/023* | (2006.01) |
| *G06F 3/041* | (2006.01) |
| *H01H 13/88* | (2006.01) |
| *H01H 13/81* | (2006.01) |
| *H01H 13/83* | (2006.01) |

(52) U.S. Cl.
CPC .......... *G06F 3/0235* (2013.01); *G06F 3/0202* (2013.01); *G06F 3/041* (2013.01); *H01H 13/81* (2013.01); *H01H 13/88* (2013.01); *G06F 2203/04102* (2013.01); *H01H 13/83* (2013.01); *H01H 2219/037* (2013.01); *H01H 2219/039* (2013.01)

(58) Field of Classification Search
CPC ...... G06F 3/0235; G06F 3/0202; G06F 3/041; G06F 3/02; H01H 13/81; H01H 13/88; H01H 13/85; G09G 5/00; H03K 17/94; H03M 11/00
See application file for complete search history.

(56) References Cited

U.S. PATENT DOCUMENTS

| | | | |
|---|---|---|---|
| 2,532,228 | A | 11/1950 | Hesh |
| 3,022,878 | A | 2/1962 | Seibel et al. |
| 3,541,541 | A | 11/1970 | Engelbart |
| 3,757,024 | A | 9/1973 | Stinson, Jr. et al. |
| 3,833,765 | A | 9/1974 | Hilbom et al. |

(Continued)

FOREIGN PATENT DOCUMENTS

| | | |
|---|---|---|
| CN | 2681192 | 2/2005 |
| CN | 201084115 | 7/2008 |

(Continued)

OTHER PUBLICATIONS

Www.keytronic.com/about/, 8 pages, printed Feb. 15, 2020.

(Continued)

*Primary Examiner* — Pegeman Karimi
(74) *Attorney, Agent, or Firm* — UConn IP Law Clinic; Yuk-Kwan Brian Yuen; Robert Endrizzi

(57) ABSTRACT

A modern two-handed keyset that can produce text, text editing functions, and computer functions. The two-handed keyset device here comprises of a first keyset and second keyset. Each keyset comprises of a plurality of keys connected to an edge plate. The individual keys are attached to the edge plate by their individual top edges and the keys are capable of deflecting independently from each other. The two keysets are connected by a communication tether configured to electronically connect the first keyset and second keyset. Corresponding systems and methods also are disclosed.

19 Claims, 20 Drawing Sheets

(56) References Cited

U.S. PATENT DOCUMENTS

| | | |
|---|---|---|
| 4,032,729 A | 6/1977 | Koistinen |
| 4,359,613 A | 11/1982 | Rooney |
| 4,442,506 A | 4/1984 | Endfield |
| 4,449,839 A | 5/1984 | Bleuer |
| 4,467,321 A | 8/1984 | Volnak |
| 4,486,637 A | 12/1984 | Chu |
| RE32,419 E | 5/1987 | Rooney |
| 4,727,478 A | 2/1988 | Endfield et al. |
| 4,775,255 A | 10/1988 | Langley |
| 4,833,446 A | 5/1989 | Eilam et al. |
| 4,914,999 A | 4/1990 | Masubuchi et al. |
| 5,189,416 A | 2/1993 | Estes |
| 5,281,966 A | 1/1994 | Walsh |
| 5,288,158 A | 2/1994 | Matias |
| 5,329,079 A | 7/1994 | English et al. |
| 5,360,955 A | 11/1994 | English et al. |
| 5,430,263 A | 7/1995 | English et al. |
| 5,481,074 A | 1/1996 | English |
| 5,493,654 A | 2/1996 | Gopher et al. |
| 5,576,706 A | 11/1996 | Daigle et al. |
| 5,649,223 A | 7/1997 | Freeman |
| 5,828,323 A | 10/1998 | Bartet |
| 5,929,357 A | 6/1999 | Masubuchi |
| 5,993,089 A | 11/1999 | Burrell, IV |
| 6,133,517 A | 10/2000 | Masubuchi |
| 6,378,234 B1 | 4/2002 | Luo |
| 6,552,717 B2 * | 4/2003 | Mailman .......... G06F 3/018 200/5 R |
| 7,005,588 B2 | 2/2006 | Pihlaja |
| 7,151,525 B2 | 12/2006 | McAlindon |
| 7,262,762 B2 | 8/2007 | McAlindon |
| 7,706,616 B2 | 4/2010 | Kristensson et al. |
| 7,724,157 B1 * | 5/2010 | Gray .......... H03M 11/08 341/22 |
| 8,017,466 B2 | 9/2011 | Nakajima et al. |
| 8,130,199 B2 | 3/2012 | Chu et al. |
| 8,164,570 B2 * | 4/2012 | Dietz .......... G06F 3/0234 345/168 |
| 8,414,207 B1 | 4/2013 | Knighton et al. |
| 8,742,275 B1 | 6/2014 | Lam et al. |
| 8,896,539 B2 | 11/2014 | Knighton et al. |
| 9,235,270 B2 | 1/2016 | Knighton et al. |
| 9,342,241 B2 * | 5/2016 | Page .......... G06F 3/0235 |
| 10,037,088 B2 | 7/2018 | Skogsrud et al. |
| 10,372,233 B1 | 8/2019 | Skogsrud et al. |
| 10,684,701 B1 * | 6/2020 | Schick .......... G06F 3/0235 |
| 2006/0088356 A1 | 4/2006 | Jawerth et al. |
| 2007/0171205 A1 | 7/2007 | Steinberg |
| 2007/0172287 A1 | 7/2007 | Hirsch |
| 2012/0136651 A1 | 5/2012 | Jawerth |
| 2015/0277578 A1 | 10/2015 | Knighton et al. |
| 2017/0031459 A1 | 2/2017 | Dennis |

FOREIGN PATENT DOCUMENTS

| | | |
|---|---|---|
| EP | 1449056 | 8/2004 |
| WO | WO1996-02394 | 2/1996 |
| WO | WO2007-148128 | 12/2007 |

OTHER PUBLICATIONS www.keytronic.com/what-we-do/design-and-engineering-support/, 14 pages, printed Feb. 15, 2020.

Gauger, Matt, "Building a Chording Keyboard" blog.mattgauger.com/2013/08/03/building-a-chording-keyboard-lessons-learned-and-progress-so-far/ 16 pages, printed Apr. 5, 2020.

* cited by examiner

TWO-HANDED KEYSET, SYSTEM, AND METHODS OF MAKING AND USING THE KEYSET AND SYSTEM

RELATED APPLICATIONS

This Non-Provisional Patent application claims priority to U.S. Provisional Patent Application 62/953,673 filed on Dec. 26, 2019.

FIELD OF THE INVENTION

This invention relates to data entry devices for computers and consumer electronics. Particularly, a two-handed device which contains a plurality of keys for each hand.

BACKGROUND

Patents of inventions of keyboards and keysets for typing, telegraphy and stenography begin over three hundred years ago. In 1714, H. Mill patented a typewriter. In 1879, M. Bartholomew patented a stenograph. In 1837, W. Cooke and C. Wheatstone patented a five key telegraph. In 1874, E. Baudot patented a five-bit code and in 1888, a telegraph keyset with five keys, for use with two fingers on the left hand and three fingers on the right hand. In order to generate the entire English alphabet, early telegraph machines needed at least five keys.

Today, computer input is largely provided from a user through the use of a keyboard and a mouse. Decades earlier, designers experimented with a range of input devices for users to interface with the computer. One such device is the electronic keyset.

The electronic keyset as a computer interface was introduced by D. Engelbart in the 1960s along with the first mouse. D. Engelbart used the mouse and the keyset together, with the keyset in the left hand and the mouse in the right hand, providing text generation and text editing with control sequences and control codes. The D. Engelbart keyset has five keys, much like earlier telegraph machines.

The D. Engelbart keyset has five keys, with a single switch for each key to generate binary codes. The five keys of the keyset and the three buttons on the mouse were used together for letters, numbers, punctuation and additional codes. The text generation on the keyset was slow and most data entry was done on a keyboard placed between the mouse and the keyset. "Letter codes" for the keyset were arranged alphabetically as binary values. Thus, the first code "A" is 00001, with 0 being not pushed and 1 being pushed, was generated by the user pushing the first key with their thumb. The second code "B" is 00010, generated with the index finger. Sequential letter combinations were used for text editing functions, such as cut, copy and paste.

D. Engelbart's keyset uses vertical hand movement and his mouse uses horizontal movement, requiring dissimilar hand gestures. The keyset, mouse and keyboard are human interface devices (HID) with current hardware and software standards for computer use. Human factor research (ergonomics) and human-computer interaction (HCI) are mature sciences.

Keysets (also called chorded keysets, chorded keyboards or chordal keyboards) are devices that allow the user to enter alphabetic letters by pressing several keys together, like playing a "chord" on a piano. The chords in this case are referred to as key combinations. This is distinct from a keyboard, which contains individual keys for the alphabetic letters. As a result of the use of key combinations, keysets are also called "chorded keysets," "chorded keyboards," or "chordal keyboards." Current keysets come in a variety of designs with six keys for one hand to twenty keys for two hands.

The key combinations on a keyset need not be limited to alphabetical characters. The key combinations can also be associated with written characters, text editing functions, such as "cut," "copy" and "paste," or computer commands to control the speakers, screen, or various aspects of the graphical user interface.

Keysets provide users with a speed and size advantage compare to other input devices. Keysets, when compared to conventional keyboards, can be smaller, faster, or both. For example, some portable keyset designs allow one handed text generation and stenographic keysets can provide real-time speech transcription. Current keysets do not have a standardized layout and therefore comparison of keysets and between keyboards and keysets is limited.

Transcription speed and error rates by users of keysets and keyboards is evaluated to measure the efficiency of a device or layout. Keysets enable users to provide input quicker than keyboards. For example, stenographic keysets used to provide real-time speech transcription produce text at a rate of 200 to 300 words per minute. In comparison, keyboard typists are only able to produce 50 to 100 words per minute. Smartphone touch screen keyboards generate text at about 35 to 50 words per minute.

Keysets may be smaller than keyboards because they have less keys. Compared to a conventional keyboard, the smaller dimensions of a keyset better complement the smaller computers of today.

What is desired, therefore, is a modern keyset to be used with a computer for everyday use.

SUMMARY

A modern keyset will associate key combinations with text, text editing functions, and computer functions. The keys on a keyset can be constructed more efficiently than a conventional keyboard because there are less keys to accommodate.

One embodiment described herein is a two-handed keyset device comprising of a first keyset and second keyset. Each keyset comprises of a plurality of keys connected to an edge plate. The individual keys are attached to the edge plate by their individual top edges and the keys are capable of deflecting independently from each other. Each keyset comprises of a plurality of electronic detectors. Each electronic detector is functionally coupled to a key on the keyplate such that the electronic detector is activated when the key is pressed. The two keysets are connected by a communication tether configured to electronically connect the first keyset and second keyset.

Another embodiment is a computer system comprising the two-handed keyset device described herein, a computer, a network, and an output device connected to the computer. The output device is configured to provide at least one of audio and visual output. At least one of the first keyset and the second keyset is connected to the computer through the network, whereby the computer receives input from the first keyset and second keyset. In some embodiments the system is a computer system comprising a computer, a display connected to the computer and a two-handed keyset connected to the computer. Each keyset comprises a plurality of keys connected to an edge plate. The individual keys are attached to the edge plate by their individual top edges and the keys are capable of deflecting independently from each other. Each keyset comprises a plurality of electronic detectors. Each electronic detector is functionally coupled to a key on the keyplate such that the electronic detector is activated when the key is pressed. A communication tether is configured to electronically connect the two keysets together. The keysets are further connected to the computer, whereby the computer receives input from the first keyset and second keyset.

Yet another embodiment described herein is a method of making a two-handed keyset. The first keyplate is made by cutting at least two slots extending from one edge of a sheet of flexible material, each slot extends to at least one-third of the way across the length of the sheet, creating keys cantilevered from the first edge plate. The second keyplate is made by cutting at least two slots extending from one edge of a sheet of flexible material, each slot extends to at least one-third of the way across the length of the sheet, creating keys cantilevered from the second edge plate. A first base and a second base are made by forming flat surfaces onto two blocks of rigid material. Electronic detectors are attached onto at least one of the surfaces of the keys and the flat surface of the first base, the number of detectors attached are equal to the number of keys on the first keyplate. Electronic detectors are attached onto at least one of the surfaces of the keys and the flat surface of the second base, the number of detectors attached are equal to the number of keys on the second keyplate. The electronic detectors for the first and second keyset are placed under the keys such that a detector is activated when a key is pressed. A communication tether is configured to connect the electronic detectors of the first keyset and second keyset. The first keyplate is attached onto the first base containing electronic detectors creating the first keyset, and the second keyplate is attached onto the second base containing electronic detectors creating the second keyset.

A further embodiment described herein is a method of providing command to a computer. The method comprises pressing on a first key on a first keyset comprising a first keyplate that includes a plurality of keys connected to an edge plate. The individual keys on the first keyset are attached to the edge plate by their respective top edges. The keys are capable of deflecting independently from each other. The first keyset includes a plurality of electronic detectors, wherein each electronic detector is functionally coupled to a key of the first keyplate such that the electronic detector is activated when the key is pressed. The method further comprises pressing on a second key on a second keyset comprising a second keyplate that includes a plurality of keys connected to an edge plate. The, the individual keys on the second keyset are attached to the edge plate by their respective top edges. The keys are capable of deflecting independently from each other. The second keyset includes a plurality of electronic detectors, wherein each electronic detector is functionally coupled to a key of the second keyplate such that the electronic detector is activated when the key is pressed. The electronic signals from the first keyset and second keyset are interpreted by a microprocessor and attached electronics into a computer command that is unique from either pressing the first key only or pressing the second key only.

Yet another embodiment described herein is a system of learning key combinations of the two-handed keyset. The system comprises of a two-handed keyset, a computer, a display and software executing on a computer. The two-handed keyset comprises a first keyplate comprising of a plurality of keys connected to an edge plate. The individual keys are attached to the edge plate by their respective top edges. The keys are capable of deflecting independently from each other. Each key of the first keyset is associated with a signal flag. The two-handed keyset comprises a second keyplate comprising of a plurality of keys connected to an edge plate. T, the individual keys are attached to the edge plate by their respective top edges. The keys the key are capable of deflecting independently from each other. Each key of the second keyset is associated with a signal flag. Software executing on the computer generates a desired text input (such as an alphabetical letter) or a description of a desired command (such as copy, cut, and paste) on the display and triggers the associated signal flags on the first keyset and second keyset.

DETAILED DESCRIPTION

Figure 1:
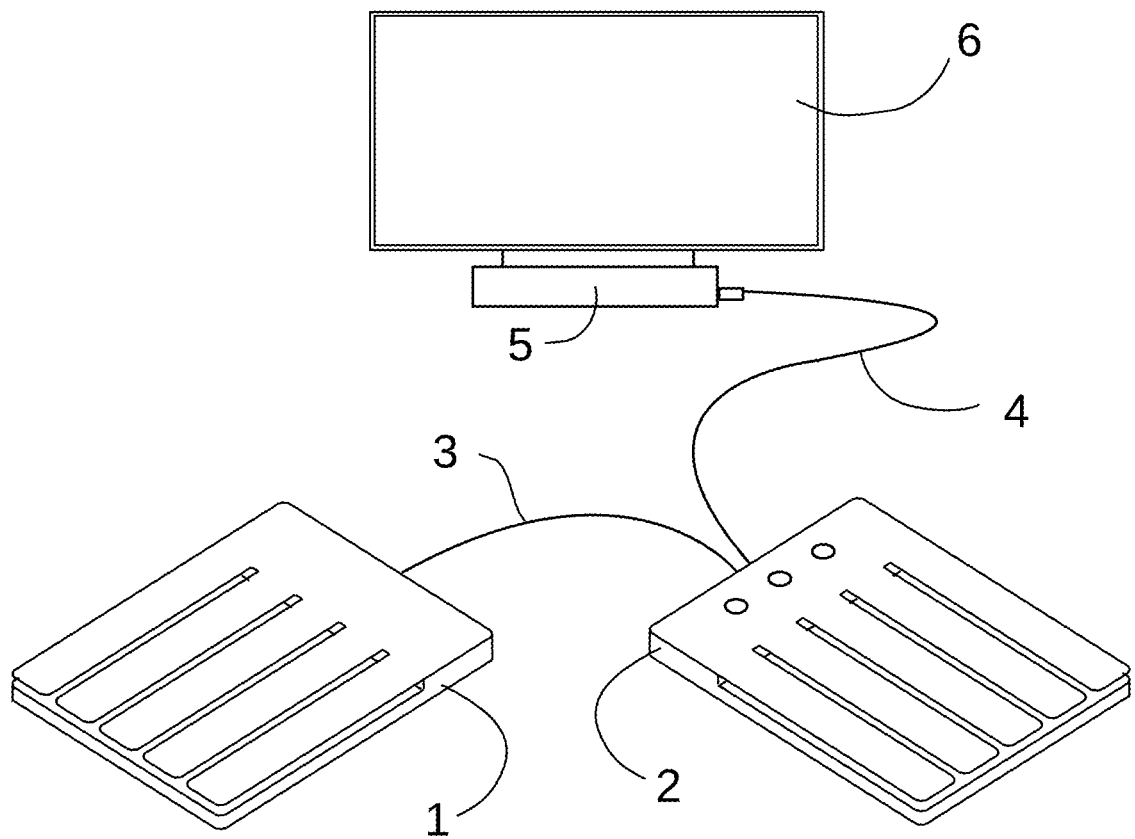
FIG. 1 shows the two-handed keyset, with the connected pair of keysets, plugged into a computer with a display.

For the purposes of the present invention, the term "computer" refers to a mainframe computer, personal computer (PC), laptop computer, notebook computer, tablet computer, personal digital assistant (PDA), cellular telephone, MP3 player or other portable electronic device, or other appropriate computer, such as home appliances, televisions, stereos, audio-visual equipment, including recording devices, security devices, printers, fax machines, medical devices, vehicles cameras, GPS equipment, laboratory equipment, RFID equipment, manufacturing machinery, and other devices having an embedded processor, or any machine having or locally associated with data storage capability.

The object of the device is to provide computer users with a two-handed keyset capable of providing input to a computer. The device can provide text input, text editing and computer commands through key combinations on the two-handed keyset. An efficient physical construction of such device is also provided.

The two-handed keyset can be used for a multitude of computer inputs, commands and functions. The two-handed keyset can be used to generate text. The two-handed keyset can also be used to control the cursor with similar hand motions. The two-handed keyset will be able to also provide menu selection, menu navigation, and other aspects of a graphical user interface. For example, the two-handed keyset would be able to control the volume of the computer, brightness of the screen, change projection device, and other computer functions.

These and other objects of the invention are achieved by provision of a device which includes two keysets connected together by a communication tether configured to electronically connect the first keyset and the second keyset. The device includes a first keyset and a second keyset. These keysets can also be referred to as the left keyset and right keyset. Each of the keysets contains a plurality of keys. Each of the keys is functionally coupled to electronic detectors.

The first keyset and second keyset communicate electronically through a communication tether configured to electronically connect the two keysets together. The communication tether could be implemented as a wired connection or a wireless connection. In one embodiment, the communication tether is a physical cable that connects the first keyset and second keyset. In another embodiment, the communication tether is a set of transmitter and receiver, such that the transmitter forwards signal from one keyset to the other and the receiver receives signals from the keysets. The transmitter and receiver combination can be made into one transceiver device. In the wireless embodiment of the communication tether, the first keyset and second keyset could be referenced as two device addresses on a receiving computer. The wireless embodiment could also be implemented so that the first keyset receives signal from the second keyset, and the first keyset delivers the combined signal to the receiver.

Each of the keysets include a keyplate, a base, and a plurality of electronic detectors. The keys located on each of keyset share a keyplate and base. The keys are formed as part of the keyplate. The keyplate resembles a comb, such that the keys are the teeth of the comb and a plate joins the keys together along a top edge. The keyplate is therefore divided into multiple keys and an edge plate which connects the keys. The structure of the keyplate enables the keys to deflect downwards when pressed. The edge plate allows the keyplate to be attached to the base. There are at least as many electronic detectors as there are keys, such that each key is functionally coupled with electronic detectors.

Each keyset is constructed from the keyplate, a base, and a plurality of electronic detectors. The electronic detectors are fixed onto the base and keyplate. The keyplate is fixed onto the base. The keyplate is fixed to the base only through the edge plate so that the keys are allowed to deflect as described. The keyplate is fixed so that each key is directly above an electronic detector. When the user presses the top-surface of the keys, the keys deflects and activates the electronic detector below.

Referring to the drawings, FIG. 1 shows a two-handed keyset connected to a computer. The two-handed keyset includes a first keyset 1 and a second keyset 2 connected together by a data cable 3. The two-handed keyset connects via a USB cable 4 to a computer 5 having a display 6. The data cable 3 is a communication tether configured to connect the two keysets together that, along with the USB cable 4, allow for two-way data flow between the two-handed keyset and the computer 5. The two-way communication is necessary to synchronize certain modes of the keysets, such as, capital lock, symbol lock, and number lock across the first keyset 1 and second keyset 2.

The placement of the keysets in relation to each other and to the user is determined by the user, the user's comfort and the workspace environment. The proposed placement of the two-handed keyset is on a flat workspace in front of the user, similar to a conventional keyboard.

Figure 2A:
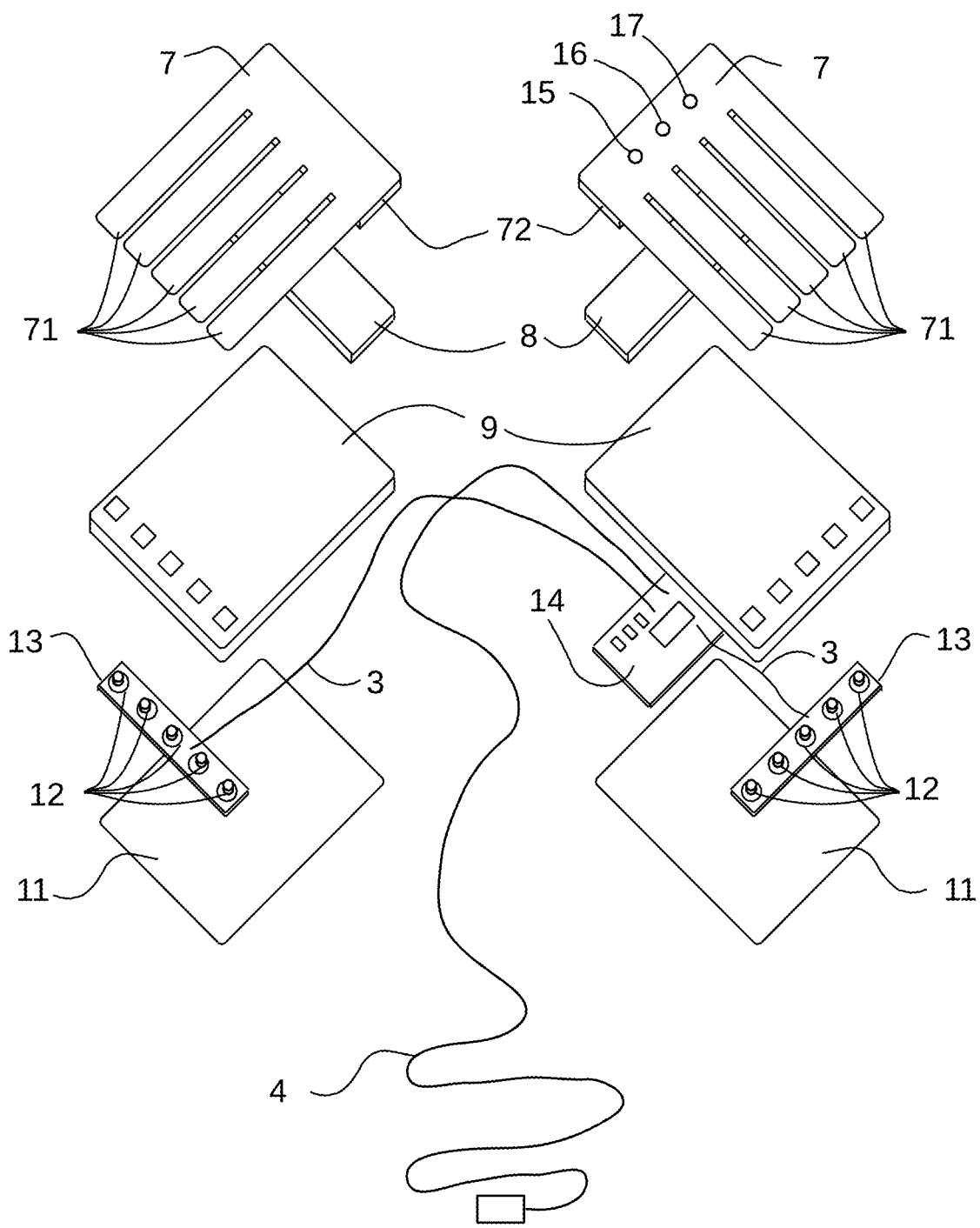
FIG. 2A shows an exploded diagram of the two-handed keyset.

Referring to the drawings, the two-handed keyset shown in FIG. 2A includes the pair of keysets, with each keyset including a keyplate 7, a spacer 8 and a base 9. The keyplate 7 has five keys 71 made of flexible plastic connected along the top edge by the edge plate 72. The spacer 8 and base 9 are made of substantially rigid plastic. The keyplate 7, spacer 8 and base 9 are joined together and made smooth with rounded corners and cleanable surfaces. The two-handed keyset has a piece of non-skid foam 11 on the bottoms of the bases.

The five keys 71 are connected along the top edge by the edge plate 72. In one embodiment, each key 71 has the dimension 20 mm (0.8 in) wide by 115 mm (4.5 in) long by 1.5 mm (0.06 in) thick. The keys 71 are separated by 2.4 mm (0.1 in). The edge plate 72 having the dimension 38 mm (1.5 in) long and 115 mm (4.5 in) wide to accommodate all five keys. The base 9 is 115 mm (4.5 in) wide by 150 mm (6.0 in) long by 6.3 mm (0.25 in) thick. The spacer 8 is 115 mm (4.5 in) wide by 38 mm (1.5 in) long by 2.4 mm (0.1 in) thick. The keys 71 and base 9 are separated vertically by 2.4 mm (0.1 in) by spacer 8. In other embodiments, each key 71 has a width in the range of about 24 mm (1.0 in) to about 12 mm (0.5 in), a length in the range of about 150 mm (6.0 in) to about 89 mm (3.5 in), and a thickness in the range of about 3.2 mm (0.12 in) to about 0.8 mm (0.03 in). In some cases, all of the keys 71 in a set have the same dimensions. In other cases, difference keys within a set have different dimensions. For example, a wider key especially for the thumb positions.

The length of the keys 71 dictates the force required to press down a key. A longer key 71 made from the same material (in this example, flexible thermoplastic or thermoset material) with the same thickness 1.5 mm (0.06 in) requires less force to press. The 115 mm (4.5 in) length represent a good compromise between tactile feedback, in the form of resistance, and strain placed on an adult user's fingers. In another embodiment, a two-handed keyset made for children has a smaller overall width having the dimension of about 72 mm to about 80 mm, or about 75 mm to about 77 mm (approximately 3.0 in) and smaller individual key 71 width having the dimension of about 10 mm to about 14 mm, or about 11 mm to about 13 mm (approximately 0.5 in). The flexibility of the keys 71 for children may also be decreased by using thinner sheets of the same material or a weaker different material altogether. In some embodiments, the thickness of the key 71 could have the dimension of about 0.7 mm to about 1.0 mm, or about 0.7 mm to about 0.9 mm (approximately 0.03 in). In conventional keyboards, activation force is defined as the weight required to activate a key. For conventional keyboards, the activation force for an individual key usually ranges from 30-100 grams (1.1-3.5 oz). A key is considered "light touch" if it requiring less than 50 grams (1.8 oz) to activate.

Five detectors 12 are installed in the base 9, with each detector activated when the associated key 71 is pressed. Each key 71 has a range of motion and detector activation point. Each detector has tactile feedback, similar to the click of a mouse.

The bases 9 contain electronic sub-assemblies 13 with five detectors 12. One base, for example the right-hand base, contains the primary electronic assembly 14 that includes the power regulator, microcontroller and associated electronics. The electronic assembly 14 possess the hardware necessary to interpret the chords formed between the first keyset and second keyset into input for a computer. The primary electronic assembly 14 connects to the sub-assemblies 13 through the data cable 3 and to the computer 5 with the USB cable 4. The USB cable 4, or another suitable electronic connection, allows for two-way data flow between the two-handed keyset and the computer 5. The two-way communication is necessary to synchronize functionalities, such as, capital lock, symbol lock, and number lock across the first keyset and second keyset. The electronic assembly 14, with the data cable 3 and USB cable 4 connect the first keyset, and second keyset and the computer. The communication tether, data cable 3 is configured to electronically connect the first keyset to the second, the USB cable 4 then provides the signal to the connected computer.

Three light emitting diodes (LED) are positioned on top of the keyplate 7 of second keyset to provide "visual indicators" to the user. In this embodiment shown in the FIG. 2A, the left LED is the capital letter lock indicator 15, the center LED is the symbol lock indicator 16 and the right LED is the number lock indicator 17. The USB cable 4 and data cable 3 permit computer messages to be displayed on the two-handed keyset as well. For example, the keyplate 7 could have multiple LEDs to provide indication of Wi-Fi connectivity and the computer power level. In another embodiment, a visual indicator is an LCD screen on the keyplate 7, and it can be used to show detailed battery level of the device, volume of the computer speaker, and alert messages from the operating system or computer applications. The LCD screen can be further enhanced so that it displays text or graphics so to alert the user to an event on the computer or a connected device. An OLED screen can take the LCD's screen place in other embodiments. A person skilled in the art understands that visual indicators provided on the edge plate can take on many forms and can be added or subtracted from the aforementioned embodiments to provide user with various visual indications.

Figure 2B:
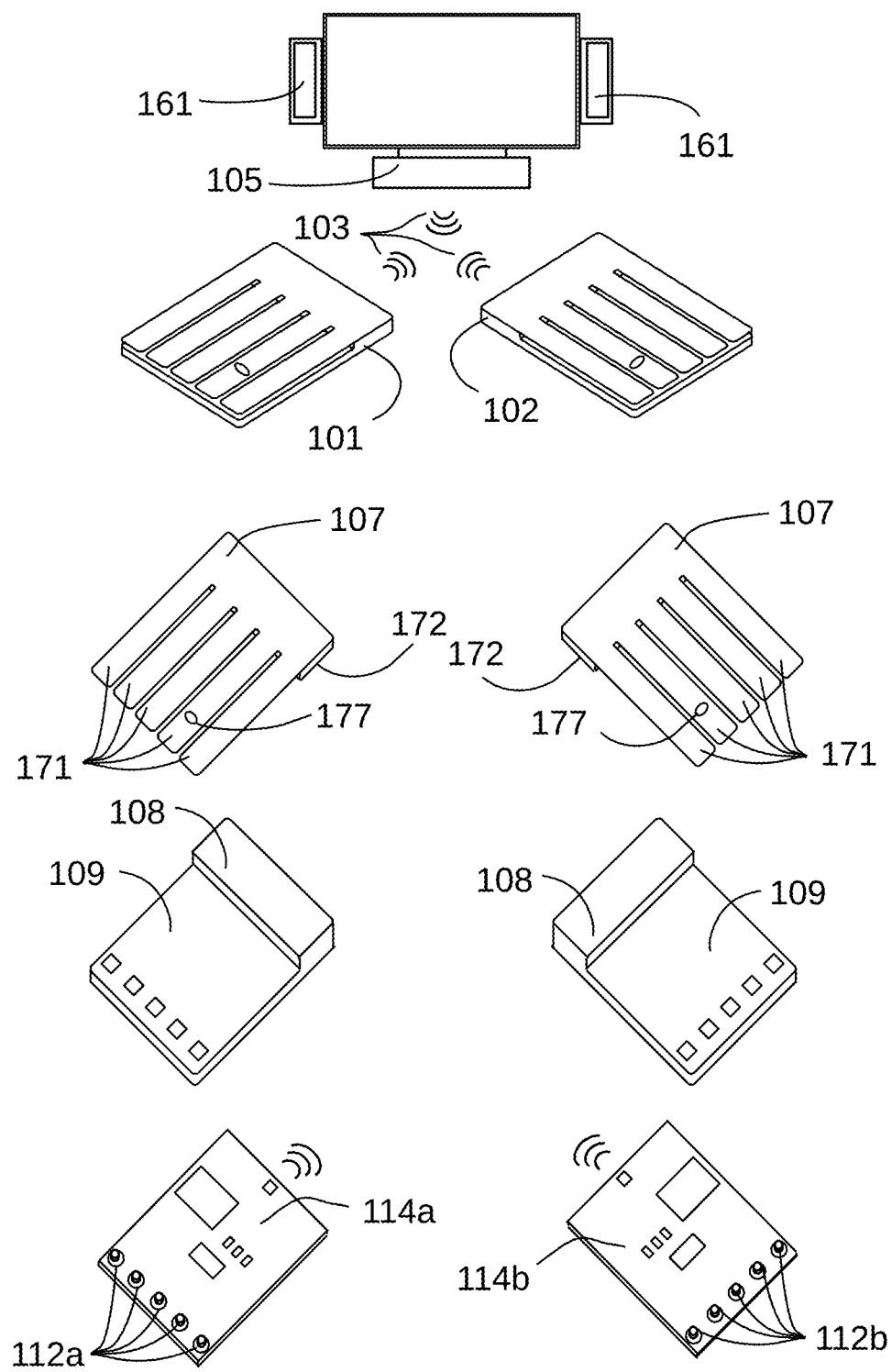
FIG. 2B shows the two-handed keyset connected to a desktop computer with an exploded diagram of the two-handed keyset.

Referring to the drawings, FIG. 2B depicts a two-handed keyset including a first keyset 101 and a second keyset 102. Each keyset includes a keyplate 107, a base 109, and electronics detectors 112. The electronic detectors 112 are capable of detecting distance such that each detector produces a signal proportional to the depth of key press. The signal would be of one distinct value when the key is un-pressed, another distinct value when the key is fully pressed down. When a key is partially pressed, the value generated is proportional to the depth a key travel when pressed. Distance sensor refers to a family of sensor that include hall-effect sensors, optical sensors, and ultrasonic sensors. The different types of sensors will necessitate a different packaging but will function the same nonetheless.

The keyplate 107 has five keys 171 and an edge plate 172. The keyplate 107 is formed so that each key 171 can be deflected independently of each other. The five keys 171 and the edge plate 172 are formed integrally as one piece. The keys 171 are cantilevered from the edge plate 172.

The base 109 provide a frame where keyplate 107 and electronic detectors 112 are mounted. Base 109 is formed so that when a user presses a key 171 or key combinations, the electronic detector 112 below senses the change in distance for one or multiple keys. Base 109 contains a step 108 so that the keys 171 hover above the electronic detectors 112.

In each keyset, keyplate 107 and base 109 are fastened together. The keyplate is formed from a thin sheet of metal. The sheet is sufficiently thin so that each key 171 can be deflected by the press of a finger. A number of electronic detectors 112 are attached onto the base 109. Keyplate 107 may contain, for example, bumps 177 on the top surface of the keys to provide tactile identification to the user's finger tips.

First keyset 101 and second keyset 102 are joined by a communication tether 103, which is configured to electronically connect the two keysets 101 and 102. Specifically, the first keyset circuit 114*a*, and second keyset circuit 114*b* are connected through a number of transmitter and receivers, one set of which resides on each of the circuits 114*a* and 114*b*. In the embodiment shown in FIG. 2B, computer 105, first keyset circuit 114*a*, and second keyset circuit 114*b* are connected wirelessly. In this embodiment, the communication tether 103, which connects the two keysets, is further connected to computer 105. The communication tether 103 comprises of a transmitter and a receiver. The communication tether 103 connects with a wireless transmitter in the first keyset 101, a wireless transmitter in the second keyset 102. The communication tether 103 is plugged into a wired electronic port on the computer 105 so that the computer 105 can receive signal from the first keyset 101 and second keyset 102. First keyset circuit 114*a* connects to the electronic detectors 112*a* on the first keyset 101. Second keyset circuit 114*b* connects to the electronic detectors 112*b* on the second keyset 102. Signal from the electronic detectors 112*a* and 112*b* are sent to computer 105 through first keyset circuit 114*a* and second keyset circuit 114*b*. Computer 105 contains software which takes the key combinations from first keyset circuit 114*a* and second keyset circuit 114*b* and translate them into text, text editing commands, and other computer commands. The electronic detectors 112*a* and 112*b* provide the keyset circuit 114*a* and 114*b* with distance data periodically. This data allows software in the computer 105 to calculate the depth, speed, or both parameters of the key presses and key combinations. The ability to detect depth permits the software to set the actuation point of the keys to accommodate for light deflections of the keys 171. A light-touch configuration would recognize key presses with less deflection. Light-touch key activation may be desirable for ergonomics reasons, such as, reducing the strain on the hand. The ability to calculate parameters such as depth and speed also allows the software to interpret signal from the two-handed keyset to simulate, for example, the playing of piano keys and pedal actuation in a diving simulator.

The electronic detectors 112 can be, for example, pressure sensors. Pressure sensors are capable of detecting the force applied such that each detector produces a signal proportional to the pressure acting upon it. The ability to detect pressure permits the software to set the actuation pressure of the keys to accommodate for light key presses of the keys 171. A light-touch configuration would recognize key presses with less pressure. Light-touch key activation may be desirable for ergonomics reasons, such as, reducing the strain on the hand. The ability to sense pressure also allows the software to calculate the strength of the key press over time, allowing the computer to interpret signal from the two-handed keyset to simulate, for example, the beating of a drum.

In different embodiments, the computer 105 may respond differently to the input of the two-handed keyset. The computer would produce one or a combination of outputs through one or more connected output devices. For example, in a personal computer loaded with a word processor, the input from the two-handed keyset may be reflected as typed text, copied text, or graphics on a connected display. On an MP3 player, the input from the two-handed keyset may be output to a headset playing a desired song, it may cause the headset's output volume to increase, or drive the computer to skip ahead in track. For an audio-visual system, the input may cause the computer to produce a musical note through attached speakers 161, it may also be programmed to output a chord or a sequence of notes.

The communication tether 103 configured to electronically connect the first keyset 101 and the second keyset 102 allows for two-way data flow between the two-handed keyset. The two-way communication tether 103 is necessary to synchronize functionalities, such as, capital lock, symbol lock, and number lock across the first keyset and second keyset. In embodiments where pressure sensors or distance sensors are used, the function being synchronized may include, for example, light-touch and normal modes.

Figure 2C:
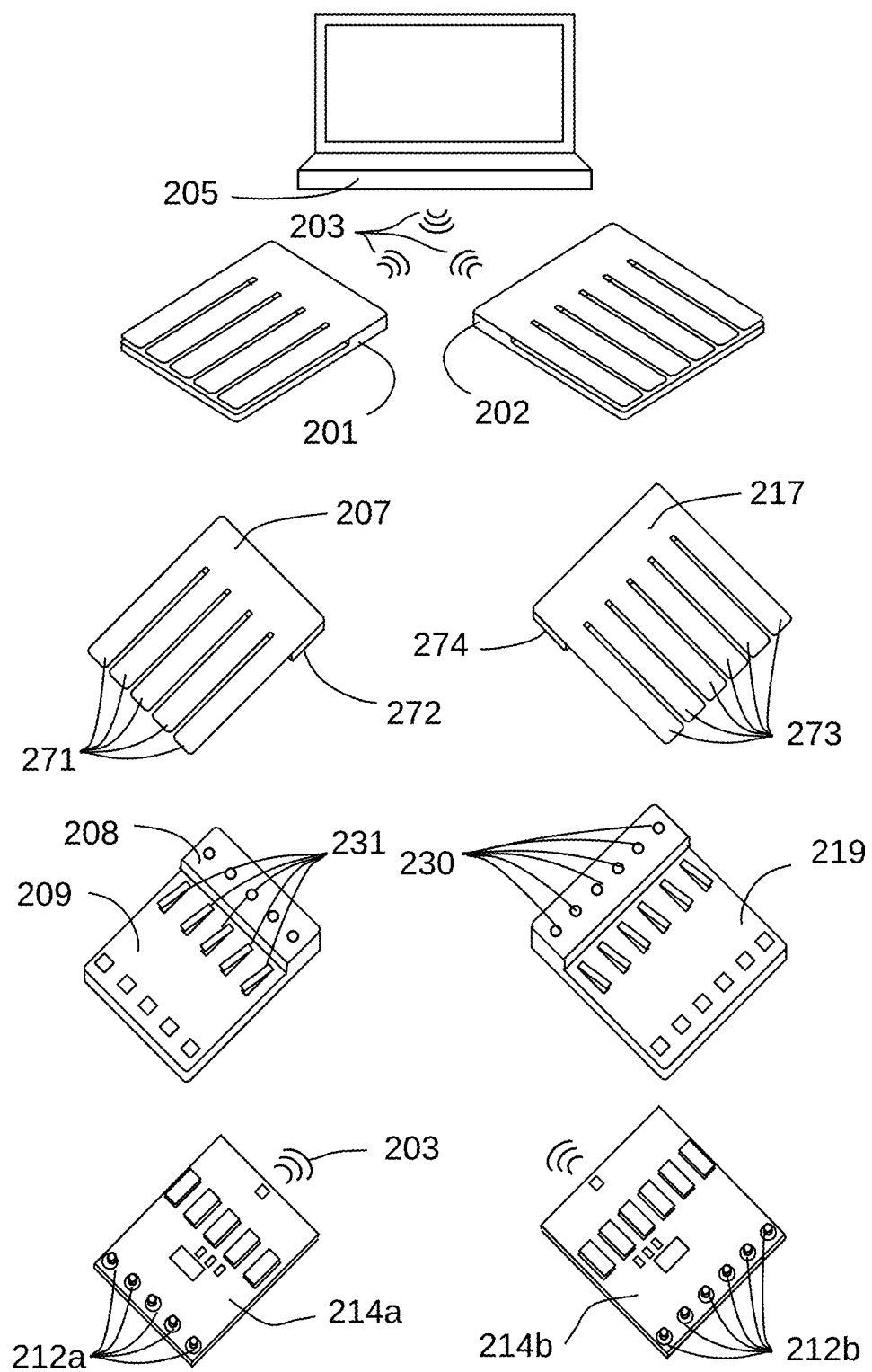
FIG. 2C shows the two-handed keyset connected to a laptop computer with an exploded diagram of the two-handed keyset.

Referring to the drawings, FIG. 2C depicts a two-handed keyset. The keyset has a first keyset 201 and a second keyset 202. The first keyset 201 includes a keyplate 207, a base 209, and electronics detectors 212a. The first keyplate 207 has five keys 271 and an edge plate 272. The first keyplate 207 is formed so that each key 271 can be deflected independently of each other. The second keyset 202 includes a keyplate 217, a base 219, and electronics detectors 212b. The second keyplate 217 includes six keys 273 and an edge plate 274. The second keyplate 217 is formed so that each key 273 can be deflected independently of each other.

In the first keyset 201, base 209 provide a frame where keyplate 207 and electronic detectors 212a are mounted. Base 209 is formed so that a user can press on a key 271 and activate the electronic detector 212a below. Base 209 contains a step 208 so that the keys 271 hover above the electronic detectors 212a. In the first keyset 201, keyplate 207 and base 209 are fastened together. First keyplate 207 has five keys 271. The first keyplate is formed from a sheet of translucent plastic. The sheet is sufficiently thin so that each key 271 can be deflected by the press of a finger. Five electronic detectors 212a are attached onto the base 209. Electronic detectors 212a are activated when the associated key 271 is pressed.

In the second keyset 202, keyplate 217 and base 219 are fastened together. Second keyplate 217 has six keys 273. The keyplate is formed from a sheet of translucent plastic. The sheet is sufficiently thin so that each key 273 can be deflected by the press of a finger. Six electronic detectors 214b are attached onto the base 209. Electronic detectors 214b are activated when the associated key 273 is pressed. The five LEDs 230 on the first keyset 201 and six LEDs on the second keyset 202 functioning as "signaling flags" are attached onto the step 208. The translucent keyplate permits the light signals from the LEDs 230 to pass through to the user. The five haptic actuators 231 on the first keyset and six haptic actuators on the second keyset functioning as "signaling flags" are attached onto the first base 209 and second base 219, respectively. Each haptic actuator can move the key above. These signaling flags serve a number of different functions. For example, in a light touch configuration described previously, a signaling flag can confirm that a key press has been recognized by the computer. In another embodiment the signaling flags can work in conjunction with applications on the computer alert users to certain event by giving visual signals, haptic signals, or both. For example, the LEDs could serve as count-down timer in a game, and the haptic signal can alert users to a message on a computer.

First keyset 201 and second keyset 202 are electronically connected by communication tether 203. Communication tether 203 is configured to connect the two keysets 201 and 202. The communication tether 203 connects through a set of transmitter and receiver on first keyset circuit 214a, and another set of transmitter and receiver on the second keyset circuit 214b. In the embodiment shown in FIG. 2C, computer 205, first keyset circuit 214a, and second keyset circuit 214b are connected wirelessly. First keyset circuit 214a connects the electronic detectors 212a on the first keyset 201. Second keyset circuit 214b connects the electronic detectors 212b on the second keyset 202. Communication tether 203 receives signal from the electronic detectors 212a through first keyset circuit 214a and sent them to computer 205. Communication tether 203 receives signal from the electronic detectors 212b through second keyset circuit 214b and sent them to computer 205. Computer 205 contains circuitry and software which takes the key combinations from first keyset circuit 214a and second keyset circuit 214b and translate them into text, text editing commands, and other computer commands.

Using the two-handed keyset requires practice and the key combinations require memorization and training, similar to touch typing and stenography training. Learning to use the two-handed keyset includes tutorials and methods specific to the user ability, language and application. Learning manuals and documentation include diagrams of the letters, symbols and numbers. Stickers for key combinations are placed on the keys while memorizing the layouts.

Memorization and training can be further facilitated by software loaded onto the computer and signaling flags on the keysets. The software will inform users of the key combinations associated with possible inputs for the computer. The software can remind users of certain key combinations that corresponds to input presented on the computer's display. The software may further include training programs which assist the user to associate key combinations with possible input. The embodiment shown in FIG. 2C provides training and feedback using signaling flags in the form of training LEDs 230 and haptic actuators 231.

The signaling flags comprises of training LEDs 230 fixed onto the first base 209 and haptic actuators 231 fixed onto the second base 219. There are as many training LEDs 230 on the first keyset 201 as there are keys 271. By the same token, there are as many haptic actuators 231 on the second keyset 202 as there are keys 273. Software loaded onto the computer can trigger training LEDs 230 to provide user with visual flags for training and assistance. The same software can trigger haptic actuators 231 to provide user with vibratory signals for training and assistance. The software may, for example, display a desired computer input such as the letter 'a' and light up the first key 271 on the first keyset 201. Other input may require triggering multiple signaling flags 230 and 231 on the first keyset 201 and second keyset 202.

The training LEDs 230 could, for example, be placed under the edge plate 272 on the first keyset 201 and edge plate 274 on the second keyset 202. Since the two edge plates 272 and 274 are translucent, when the training LEDs 230 are triggered, light will pass through the plastic and be visible to the user. This principle will also apply to clear keyplates that also allows for light transmission. In another embodiment, holes are formed on the first key plate 207 to allow the light from the training LEDs 230 to pass though. The holes formed may be used, for example, in combination with opaque keyplates of different materials, translucent keyplate, and clear keyplates. The training LEDs may, for example, also be placed on top of the edge plate 272. The placement of the signaling flag should readily allow the user to associate the signal with the key.

Haptic actuators 231 can be provided in the form of piezoelectric actuators, solenoid, or buzzer motor. When haptic actuators 231 are triggered, they provide a motion to signal the user. In this embodiment, haptic actuators 231 are placed below each of the keys 273 of the second keyplate 217. In this instance, when the haptic actuator is triggered, the key would move. Generally, the key would vibrate, shake, or click. Regardless of the placement of the actuators, software executing on the computer may, for example, display a desired computer input such as the letter 's' and trigger the second key 273 on the second keyset 202 by a piezoelectric actuator.

Haptic actuators 231 are particularly useful for training, because movement of the haptic sensor will be felt without the user looking away from the display. In another embodiment, haptic actuator 231 may be used in combination with training LEDs 230 such that each key is associated with one training LED and one haptic actuator. The trainee of the keyset can then select the desired type or types of feedback. In yet another embodiment, the keys 271 of the first keyset 201 and keys 273 second keyset 202 are only associated with one type of signaling flags.

The communication tether 203 configured to electronically connect the two keysets 201 and 202 allows for two-way data flow between the two-handed keyset and the computer. The two-way communication tether 203 is necessary to synchronize functionalities, such as, capital lock, symbol lock, and number lock across the first keyset 201 and second keyset 202. In embodiments where at least one set of signal flags is present, the function being synchronized may include, for example, lights off, blinking lights, haptic response off, low haptic response, and high haptic response. This synchronization will further permit the two-handed keyset to adopt to individual user's preference.

Figure 2D:
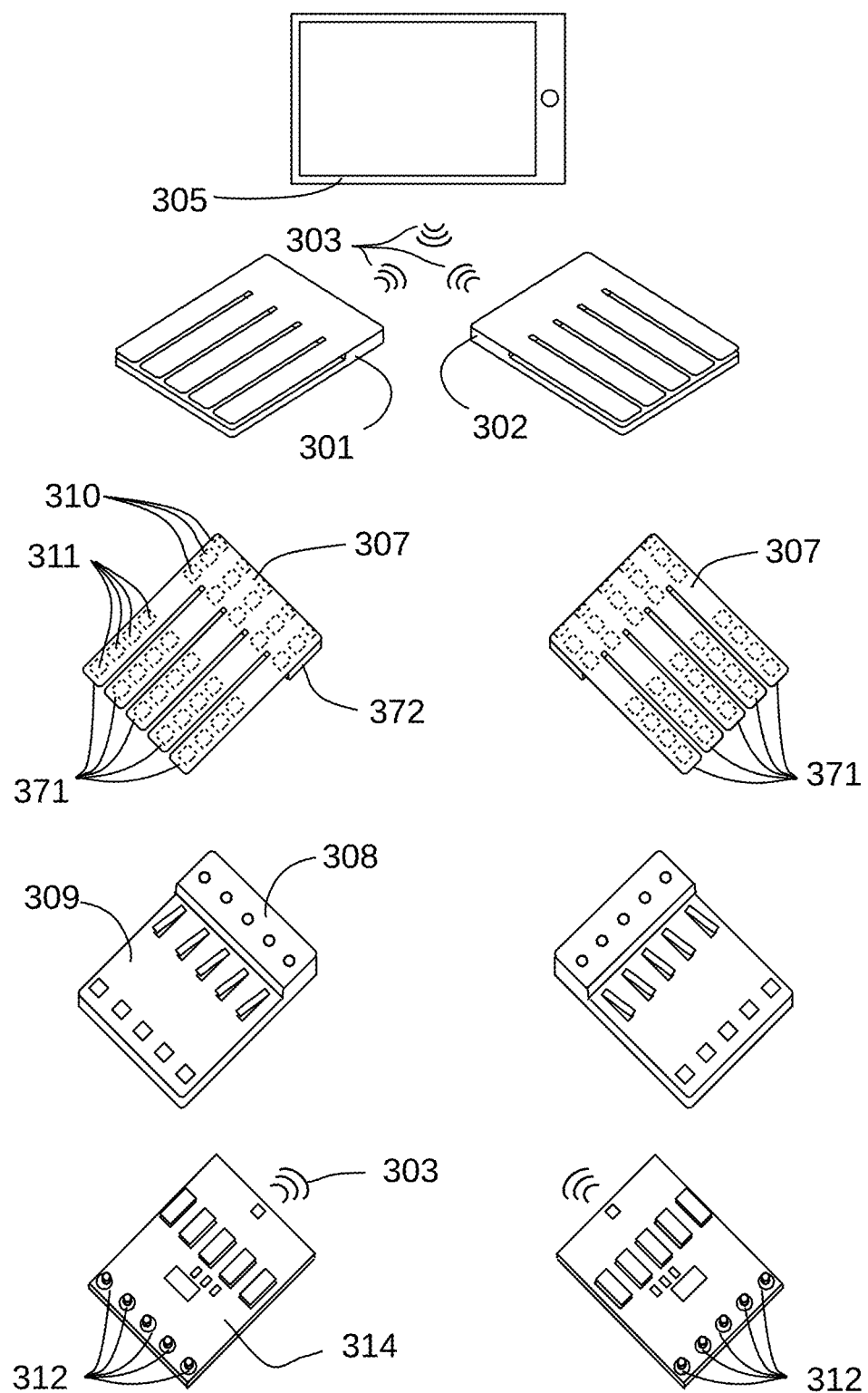
FIG. 2D shows the two-handed keyset connected to a tablet computer with an exploded diagram of the two-handed keyset.

Referring to the drawings, FIG. 2D depicts a two-handed keyset. The two-handed keyset employs touch surface sensor 311 on the top surface of the keyplate 307. The keyset includes a first keyset 301 and a second keyset 302. The first keyset 301 includes a keyplate 307, a base 309, and electronics detectors 312. The keyplate 307 has five keys 371 and an edge plate 372. The keyplate 307 is formed so that each key 371 can be deflected independently of each other.

There are three touch surface sensors 310 placed on the edge plate 372 above each key. There are four touch surface sensors 311 placed along the length of each key 371. Each touch surface sensor on the edge plate 310 and key 311 is able to generate its own unique signal when a stylus is placed on its surface. In the operation of the keyset, the finger is the most readily available stylus.

Touch surface sensor 311, as used herein, refers to a number of types of touch-sensitive sensors that are known in the art. Capacitance sensors are most commonly used on computers today. Resistive sensors, surface acoustic wave sensors, and infrared grid sensors may also be used. The touch surface sensor can be used in conjunction with different types of visual indicators. The touch surface sensors could, for example, be overlaid over a flexible LCD screen. Touch surface sensors can be made with clear flexible material and the visual indicators can extend to cover the entire keyplate 307. In this configuration, the visual indicator can display a multitude of visual signals to the user.

Each of the three touch surface sensors 310 on the edge plate 372 is configured to produce a unique signal. The touch surface sensors 310 may perform, for example, the equivalent function of "F" keys, number lock, or caps locks on a conventional keyboard.

In another embodiment, only one touch surface sensor 311 is affixed to one key 311 of the first keyset. This configuration allows one key to provide one additional input. The one touch surface sensor does not have to cover the entire top surface of the key. This allows the key to have a contact-sensitive section with the touch surface sensor and another "no-contact" section without the contact-sensing capability. The no-contact section may be the top surface of a key 371. The no-contact section may also be a textured decal or pad added onto distinguish the contact and no-contact sections.

In another embodiment, four touch surface sensors 311 are affixed along the lengths of each keys 371 of the first keyset. These touch surface sensors 311 can track the stylus's contact along the length of each key 371 and permit the keyset to provide tracking data to the attached computer. The tracking data can provide the keyset with a "slider" function. The slider input can be programmed to perform the same function as, for example, a slider on MIDI controller. Additional touch surface sensors can be added to increase the resolution of the slider for a given key length. For example, one hundred touch surface sensors 311 affixed to the same key 311 will allow the slider to have ten times the resolution of a key with only ten touch surface sensors. The slider function on each key 311 of the first keyset would permit the first keyset to provide five individual slider input to the attached computer.

These non-limiting embodiments serve to demonstrate that a number of touch surface sensors 311 can be added to one key 371. These touch surface sensors permit the user to produce unique output by contacting parts of the keys. The contact signal from the touch surface sensor can be used in combinations with the pressing of key and key combinations.

In the first keyset 301, base 309 provides a frame where keyplate 307 and electronic detectors 312 are mounted. Base 309 is formed so that a user can press on a key 371 and activate the electronic detector 312 below. Base 309 contains a step 308 so that the keys 371 hover above the electronic detectors 312. The touch surface sensors 311 are affixed directly onto the top surface of the keys 371. Each touch surface sensor 311 generates its own unique signal when contacted by a stylus.

In the first keyset, keyplate 307 and base 309 are fastened together. Keyplate 307 includes five keys 371. The keyplate is formed from a thin sheet of plastic. The sheet is sufficiently thin so that each key 371 can be deflected by the press of a finger. Five electronic detectors 312 are attached onto the base 309. Electronic detectors 312 are activated when the associated key 371 is pressed. Touch surface sensors 311 detect the contact of a stylus independent of other touch surface sensors and independent of the electronic detector 312 activation.

Communication tether 303 is configured to electronically connect the first keyset 301 and second keyset 302. The bases 309 contain electronic sub-assemblies 313 with five detectors 312. The base of both the first keyset 301 and second keyset 302 contain the electronic assembly 314 comprising the power regulator, microcontroller and a transceiver. The microcontrollers monitor the touch surface sensors 311 i 301301 and the electronic detectors 312 of the second keyset 3022. The transceiver in each of the keysets are paired with a transceiver that comprises of the communication tether 303. The transceivers installed on the keysets 301 and 302 function with software on the computer 305 to transmit signal from the electronic detectors 312 and touch surface sensor 311 to the computer 305. The microcontroller would produce a signal when a stylus contacts a touch surface sensor. The communication tether 303 would provide the signal from the touch surface sensors 311 to the connected computer independent of any electronic detectors 312 associated with keys 371312 in either the first keyset 301 or second keyset 302.

The communication tether 303 allows for two-way data flow between the two-handed keyset 301 and 302 and the computer 305. The communication tether 303, which is configured to electronically connect the first keyset to the second keyset, is necessary to synchronize functionalities, such as, capital lock, symbol lock, and number lock across the first keyset 301 and second keyset 302.

Figure 2E:
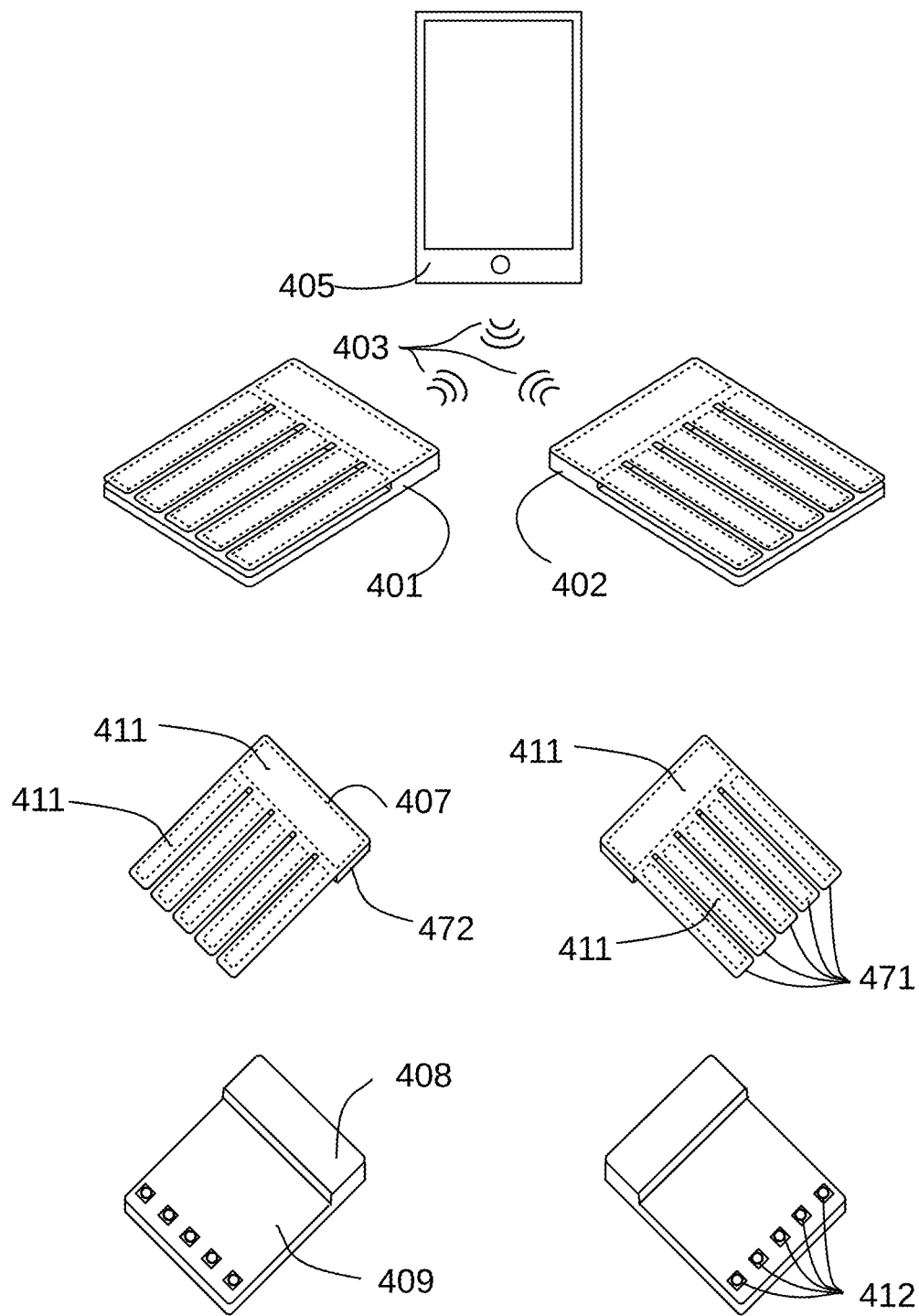
FIG. 2E shows the two-handed keyset connected to a smartphone computer with an exploded diagram of the two-handed keyset.

FIG. 2E is an embodiment of the two-handed keyset, with a first keyset 401 and second keyset 402, using combined touch surface sensors and visual indicators, referred to as a "touch display" 411. The keys 471 each have a flexible touch display 411. The top of the keyplate 407 includes a rigid touch display 411. Touch surface sensors with touch displays 411 are a mature technology used in smartphones, tablets and electronic paper devices, where the microelectronics provides the touch surface sensor above the display screen.

Current display technology utilizes organic light emitting displays or liquid crystal displays (OLED/LCD) which allow the touch displays to be flexible or rigid. Touch displays 411 may be used for the keys 471 and the edge plate 472 of the keyplate 407. This embodiment provides a continuous interactive graphical user interface. Touch displays 411 can respond to a user's actions in a graphical manner by refreshing the display below the touch surface sensor. Touch displays may be black and white or full color.

The two-handed keyset communicates on a wireless network 403 with a computer 405 for data transfer. The network may be organized in various topologies to facilitate data transfers between the first keyset 401 and the second keyset 402 and the computer 405. The base 409 includes the electronic detectors 412.

Figure 3:
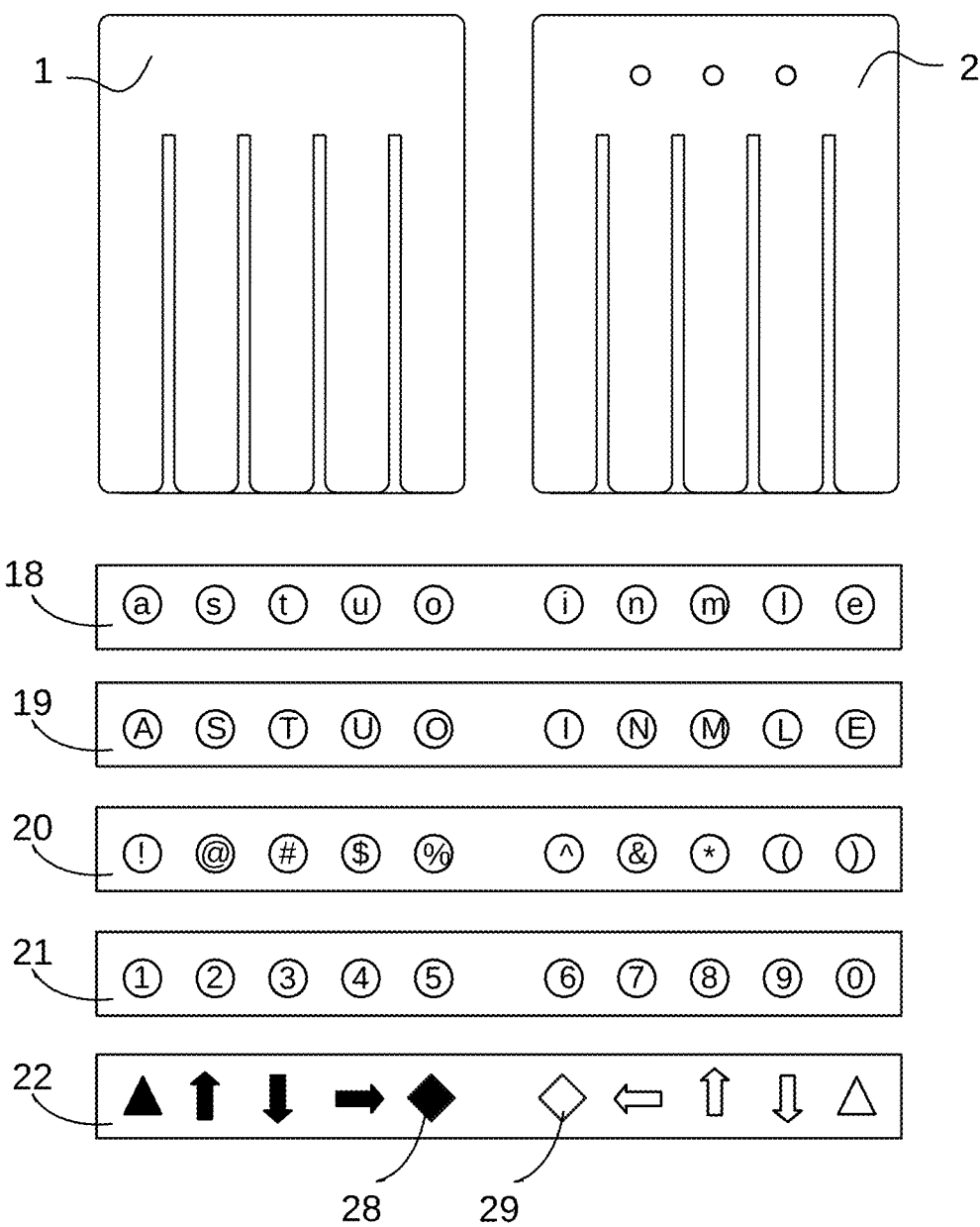
FIG. 3 is a drawing of the pair of keysets, with diagrams of the home rows for five modes.

FIG. 3 shows a two-handed keyset with diagrams for five modes. This keyset is described below in further detail.

Figure 4A:
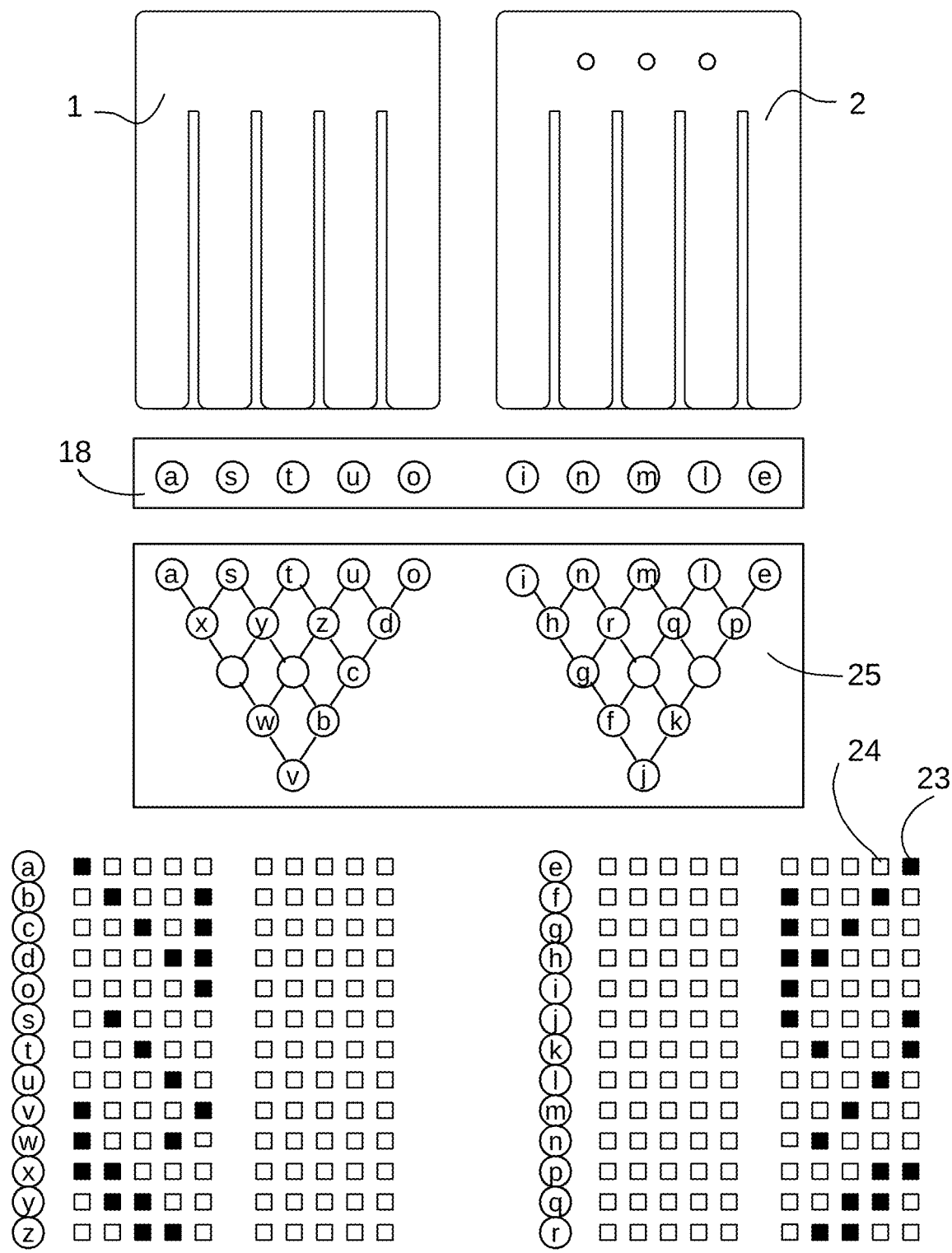
FIG. 4A is a drawing of the pair of keysets, the home row of the letter mode, the triangular key charts of the key codes for the letters and the binary pattern of key codes for the letters.
Figure 4B:
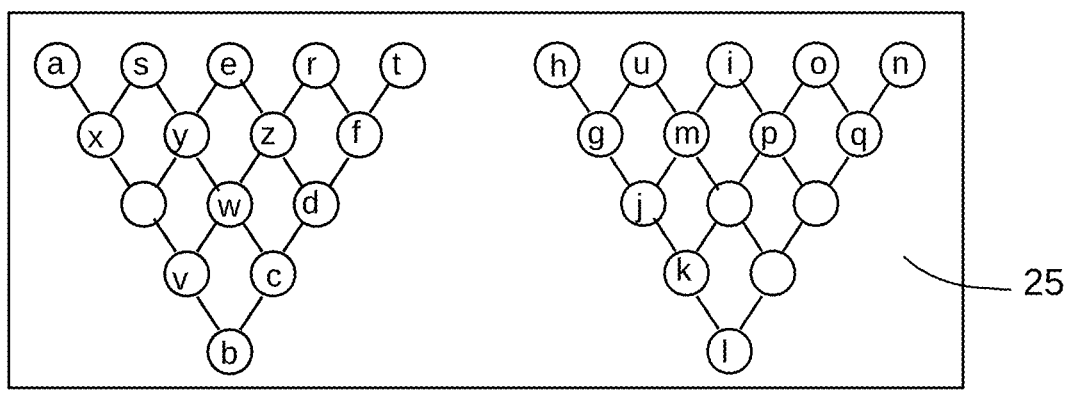
FIG. 4B shows another example of a key chart of the two-handed keyset.
Figure 4C:
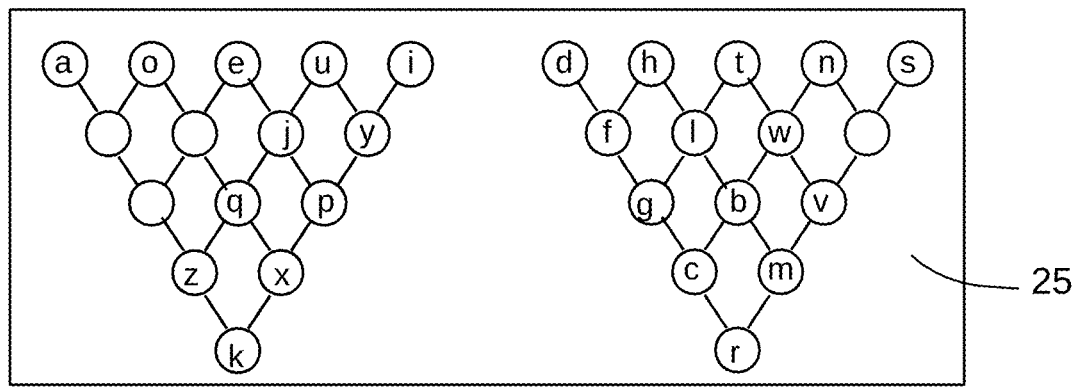
FIG. 4C shows yet another example of a key chart of the two-handed keyset.
Figure 4D:
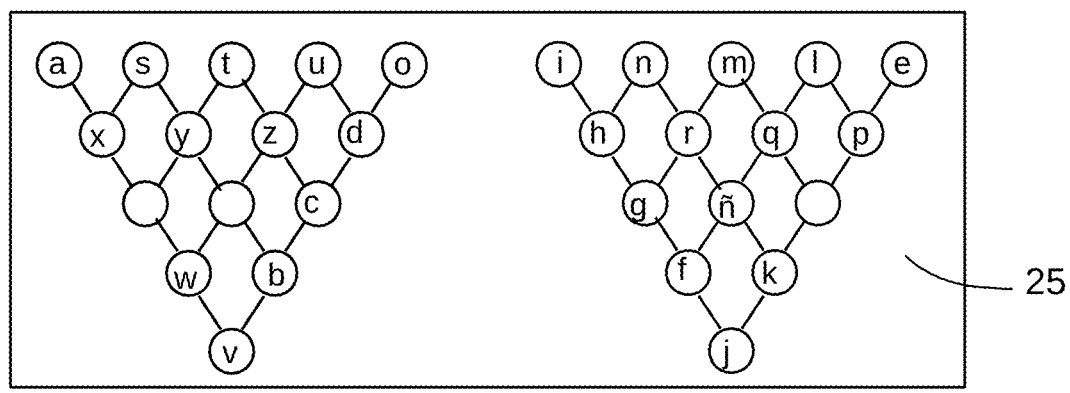
FIG. 4D shows yet another example of a key chart of the two-handed keyset.
Figure 4E:
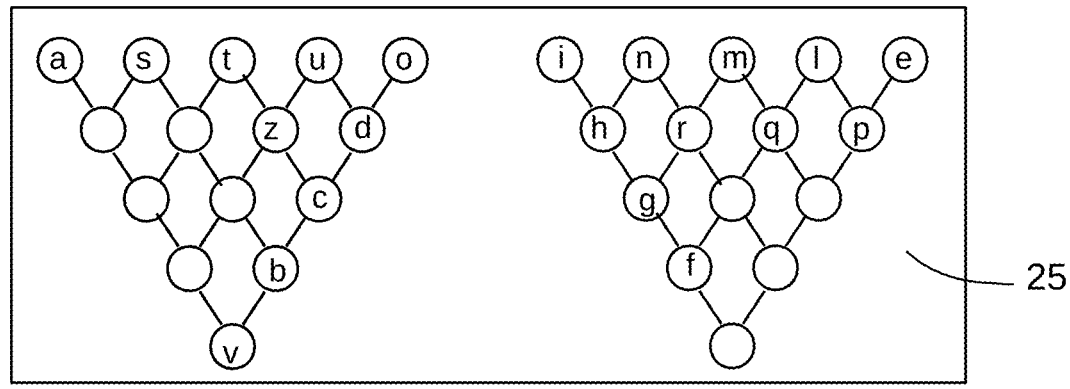
FIG. 4E shows a further example of a key chart of the two-handed keyset.

FIG. 4A show embodiments of the alphabetic layout for users of conventional keyboards. The layout of the alphabet attempts to use conventional hand and finger gestures that have been learned by the user to be easily remapped for use with the two-handed keyset. This includes matching homerow keys for Dvorak keyboard users. FIG. 4B and FIG. 4C show the embodiments of the alphabetic layout in the key charts 25 that are distinct from FIG. 4A for users of conventional keyboards. FIG. 4B shows the key chart 25 for a layout similar to conventional Qwerty keyboards, for use with the two-handed keyset. FIG. 4C shows the key chart 25 with the homerow keys for a Dvorak keyboard, for use with the two-handed keyset. FIG. 4D and FIG. 4E show embodiments of the alphabetic layout in the key charts 25 for additional languages. FIG. 4D shows the key chart 25 for the Spanish language layout with the simple addition of a letter (ñ) FIG. 4E shows the key chart 25 for the Italian language layout, where letters (w, v, x, y and j) have been removed.

These embodiments show possible layouts for Indo-European languages, where alphabets range from tens to hundreds of letters. Chinese, Japanese and Korean use ideographs and have thousands of glyphs. The two-handed keyset, with a single electronic detector for each key and having ten keys, provides over one thousand binary codes. The two-handed keyset, with a single electronic detector for each key and having ten keys and multiple touch sensors, has millions of possible binary codes and multiple layouts for all languages.

These embodiments show the alphabetic layouts where the alphabets are similar. Alphabets range from 14 to 64 letters for languages like English that use phonetic scripts. Chinese, Japanese and Korean use ideographs and have thousands of glyphs. Languages that have more letters, accents, and glyphs can have layouts for the two-handed keyset.

The two-handed keyset with ten keys has 1024 possible binary codes. The two-handed keyset with ten keys and multiple touch sensors has millions of possible binary codes. The methods for generating useful layouts for languages can be based on sounds, shapes and other categories.

Figure 10:
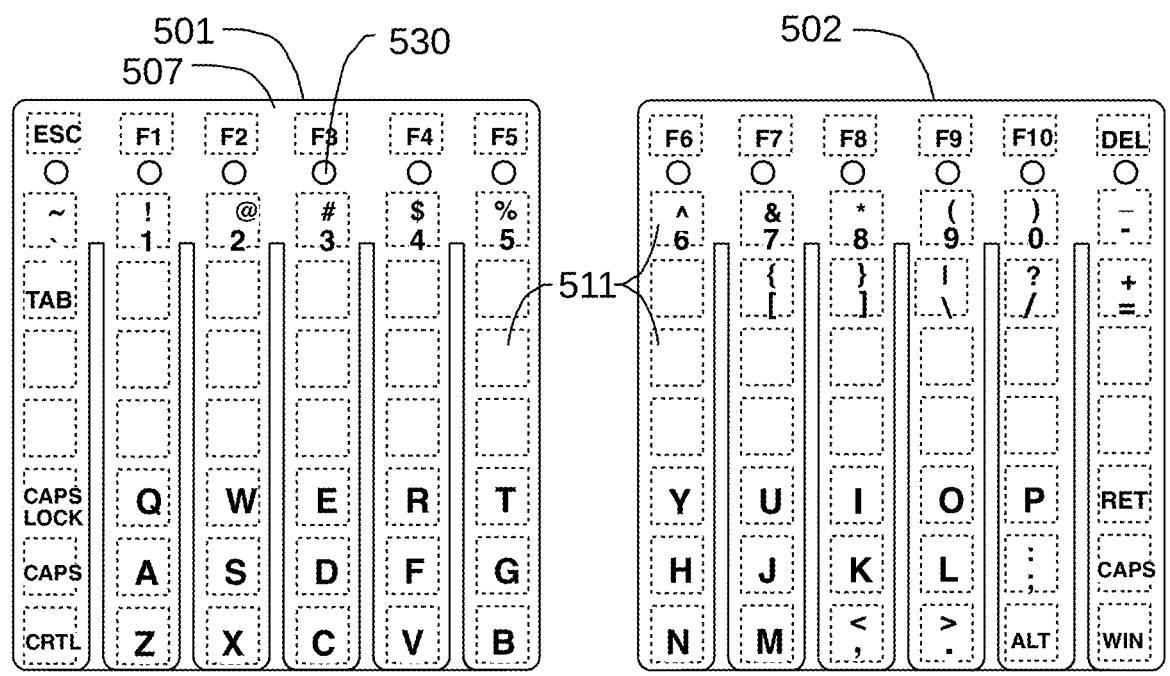
FIG. 10 shows a layout of the two-handed keyset.

FIG. 10 is an embodiment of the two-handed keyset from FIG. 2D, with first keyset 501 and second keyset 502, showing a conventional keyboard layout that includes touch surface sensors 511. This embodiment has six keys on each keyplate 507 with touch surface sensors 511 arrayed on each key and on the edge plates. Three touch surface sensors 511 on lower portion of each key indicate the letter values associated with the user's selection similar to a conventional Qwerty keyboard. The location of the modifier touch surface sensors 511 (CAPS, WIN, ALT, CTRL) is along the bottom of the keys.

The modifier touch surface sensors 511 (CAPS, WIN, ALT, CTRL) are selected by the user fingertip placement. Modifier touch surface sensor selection may be made with or without activating the electronic detector associated with the key containing the touch sensor. A touch surface sensor can be an activated in addition to other touch surface sensors and electronic detectors.

The two-handed keyset layout includes on the top of the keyset 507 touch surface sensors 511, the symbols, numbers and function keys of a conventional Qwerty keyboard. The touch surface sensors 511 at the top of keyset 507 is immobile and each symbol is selected by a single finger selection. Visual indicators 530 can display user selections, key conditions or other information to the user.

Figure 11:
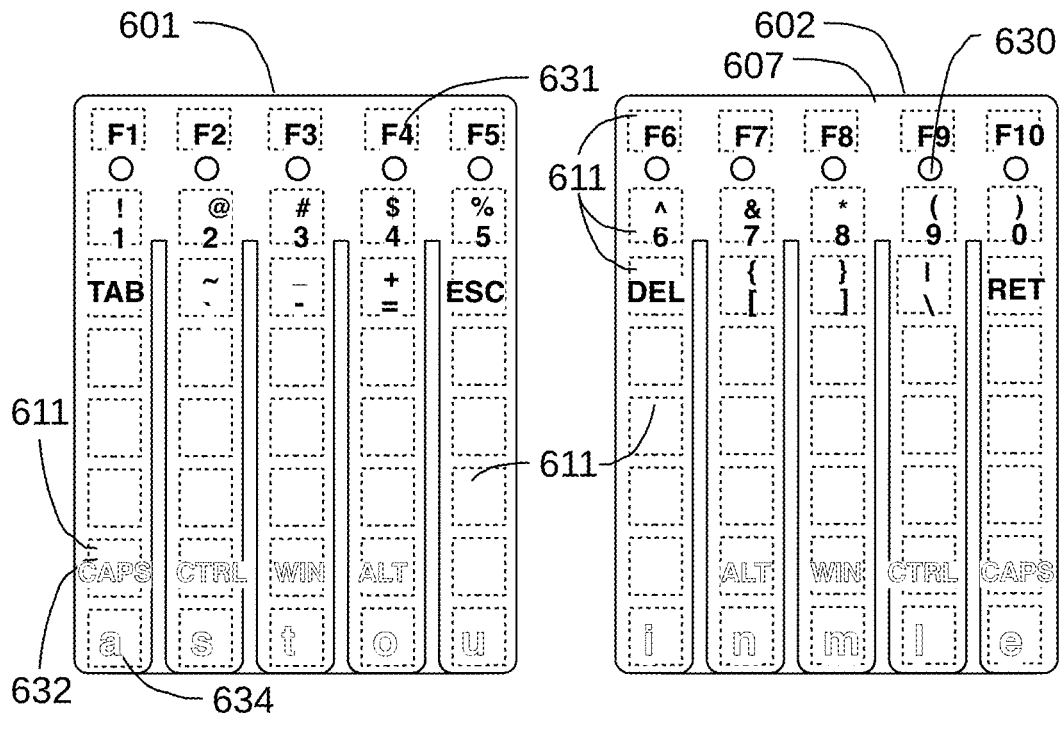
FIG. 11 shows a layout of the two-handed keyset.
Figure 11:
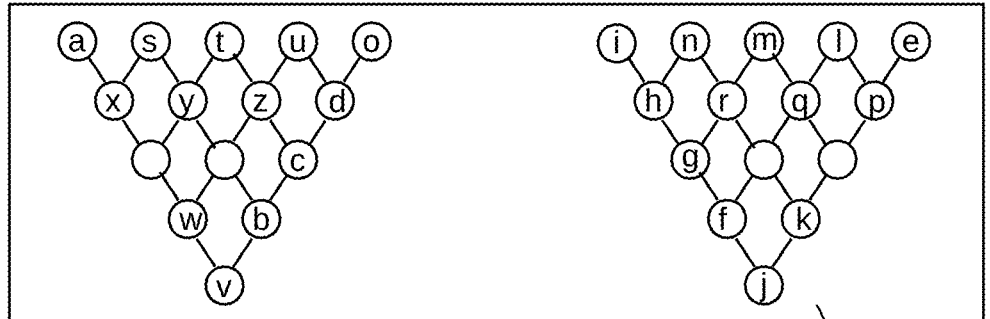
Figure 11:
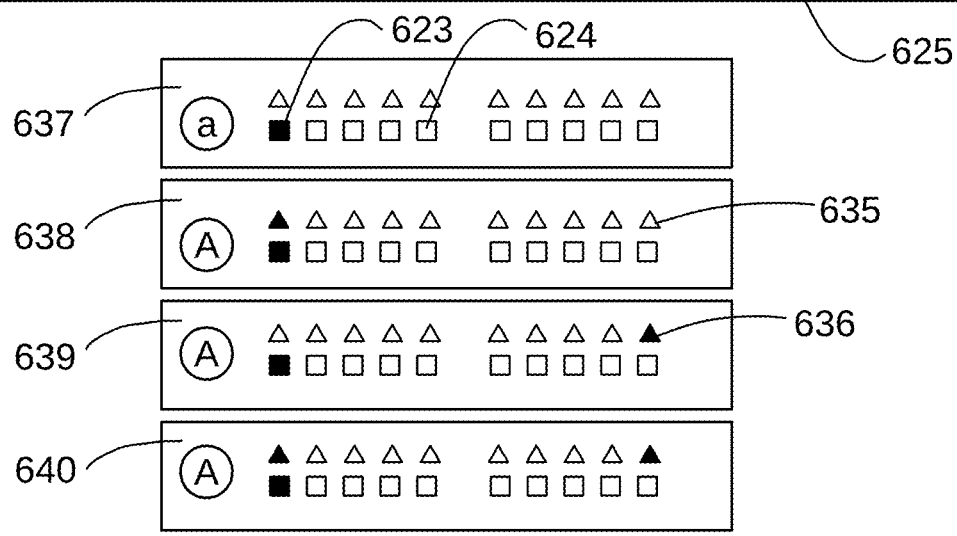

FIG. 11 is an embodiment of the two-handed keyset from FIG. 2D, with a first keyset 601 and second keyset 602, showing the chorded keyset layout that includes touch surface sensors. The layout shows the alphabetic homerow (a, s, t, o, u, i, l, m, n, e) from FIG. 4A, where homerow letters and modifier labels are indicative and would not be necessarily printed on the two-handed keyset, except for training purposes. The touch surface sensors 611 are used to distinguish the user selection during the key depression.

FIG. 11 shows a two-handed keyset layout which indicates the modifier touch surface sensor CAPS 632 on an associated touch surface sensor 611. The modifier touch surface sensors (CAPS, WIN, ALT, CTRL) are selected by the user fingertip placement. Modifier touch surface sensor selection may be made with or without activating the electronic detector associated with the key containing the touch surface sensor.

The two-handed keyset touch surface sensors 611 are used to distinguish the user's selection, where the key deflection activates the electronic detector associated with each key. FIG. 11 show the two-handed keyset as a data input device for computers, where the data is the combination of the electronic detector activation and the touch surface sensor selection. Computer data may include but is not limited to, alphabets, numbers, symbols, control characters and glyphs.

FIG. 11 shows a two-handed keyset layout with key chart 626 for letters selected with one and two fingers, matching FIG. 4A layout and function. FIG. 11 shows the functional usage of the touch surface sensors 611 as another user selectable option. The binary representation of the electronic detector condition as selected is shown with a black square 623. The binary representation of the electronic detector condition as unselected is shown with a white square 624. The binary representation of the touch surface sensor condition as selected is shown with a black triangle 636. The binary representation of the touch surface sensor condition 611 as unselected is shown with a white triangle 635.

The two-handed keyset touch surface sensor generates text when a key is depressed by the user's fingertip that is located on the associated text touch surface sensor. These examples show the similarity to alphabetic selection from FIG. 4A with a two-handed keyset that does not utilize touch surface sensors. The addition of touch sensors to the two-handed keyset increases complexity of gestural control.

The binary selection chart 637 uses the first keyset 601. In this example, the binary pattern is selected the modifier touch surface sensor 611 shown with letter "a" 634 and activates the associated electronic detector for the leftmost key, thereby producing the computer data input of the letter "a". The binary selection chart 638 uses the first keyset 601. In this example, the binary pattern is selected with the modifier touch surface sensor 611 shown with "CAPS" 632 and activates the associated electronic detector for the leftmost key, thereby producing the computer data input of the letter "A". The binary selection chart 639 uses the first keyset 601 and the second keyset 602. In this example, the binary pattern is selected with the modifier touch surface sensor 611 shown with "CAPS" on the second keyset 602 in coordination with the chordal selection for the letter "a", thereby producing the computer data input of the letter "A".

The binary selection chart 640 uses the first keyset 601 and the second keyset 602. In this example, the binary pattern is selected with the modifier touch surface sensor 611 "CAPS" on the first keyset 601 and the second keyset 602 in coordination with the chordal selection for the letter "a", thereby producing the computer data input of the letter "A".

These examples show the complexity of selections with touch surface sensor and electronic detector combinations for computer input. The complex selections can use the modifier touch surface sensors. The complex selections can use the modifier touch surface sensors (CAPS, WIN, ALT, CTRL) and electronic detector combinations for computer control. The modifier keys provide letter selection with touch sensor selection to be used for computer control, including but not limited to, data storage, file manipulation, text selection, copy and paste.

The user can select symbols, numbers and functions using the touch surface sensors 611 along the top of the first keyset 601 or the second keyset 602. These selections may use touch surface sensor activation only, as the deflection of the keys becomes negligible and does not activate the electronic detector. These selections can be made in addition to the modifier touch surface sensor 632 to produce additional symbols, numbers and functions. Visual indicators 630 can display user selections, sensor conditions or other information to the user.

The selection of "F" key functions are similar to a conventional keyboard usage. The two-handed keyset can use the "F" keys to determine the user modes for inputting data specific to an application. For example, the use of numeric function of the two-handed keyset with a spreadsheet application may be selected with the "F4" 631.

Figure 12:
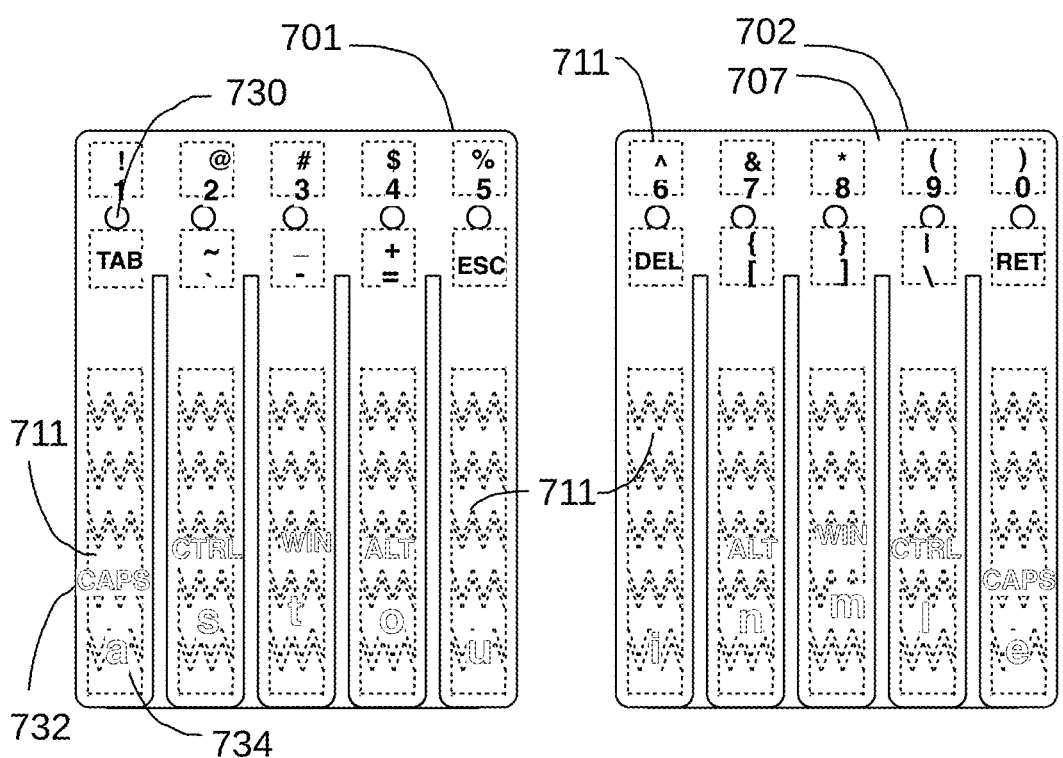
FIG. 12 shows a layout of the two-handed keyset.

FIG. 12 is an embodiment of the two-handed keyset from FIG. 2D, with a first keyset 701 and second keyset 702, showing a layout with touch surface sensors utilizing capacitive sliders 711 on the keys. Capacitive sliders provide a continuous value over the length of the key for use in evaluating the user's intention or selection. Different touch surface sensor layouts are used for capacitive slider compared to capacitive areas used as buttons. A touch surface sensor's surface can be used as a button or a slider by changing the capacitive shape and combining adjacent sensors.

FIG. 12 shows the use of a slider to adjust the homerow letters and modifiers to match a user's fingertip position. Users hands and fingers range in size and finger length, which can cause discomfort when using standard keyboards or input devices. The two-handed keyset with capacitive sliders uses software to adjust to the normal user fingertip position by defining areas that provide the user the best comfort and control.

The location of the letter "a" 734 is along the lower edge of the key. The location of "CAPS" 732 above the letter "a" can be adjusted to match comfortable extension of the finger. The location of the letter "s" is raised to match a user's fingertip location and the "CTRL" is moved to accommodate the user's comfort as well.

The touch surface sensors 711 at the top edge of the keyplate 707 are not arranged in a slider configuration, but instead in single sensor areas for use as buttons. The touch surface sensors 711 at the top edge of the keyplate 707 allow the user to select some symbols, numbers and functions. Visual indicators 730 can display user selections, key conditions or other information to the user.

Figure 13:
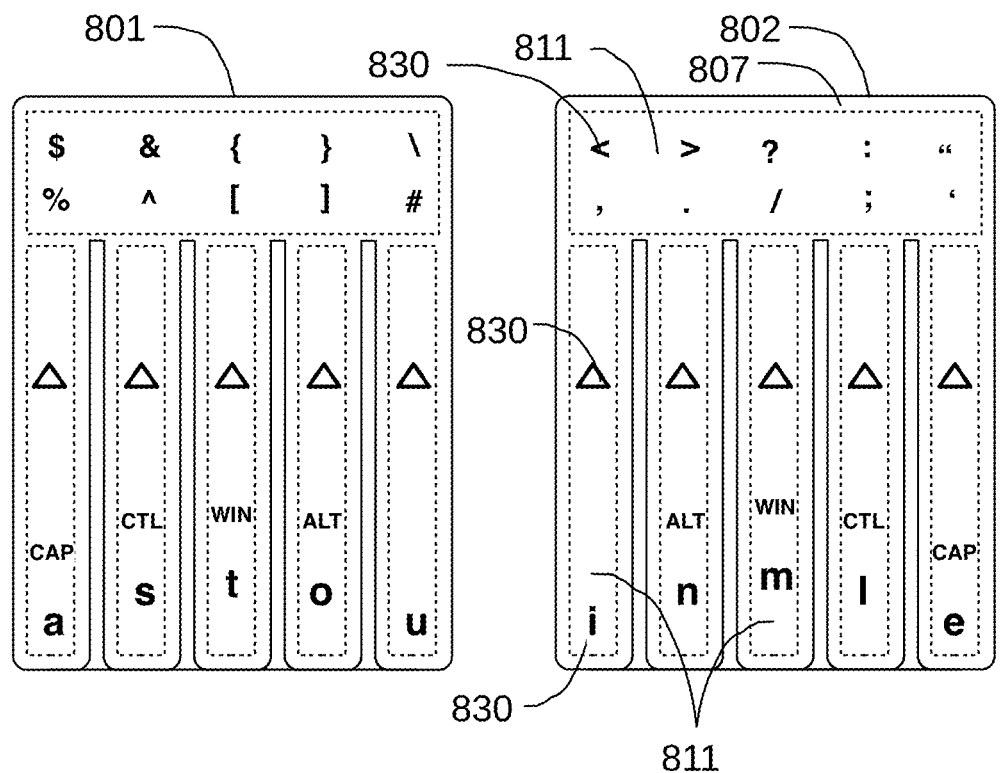
FIG. 13 shows a layout of the two-handed keyset.

FIG. 13 is an embodiment of the two-handed keyset from FIG. 2D, with a first keyset 801 and second keyset 802, showing a layout with touch displays 811. The visual indicators 830 may graphical images on the touch display. The visual indicators 830 may be displayed, selected and modified by the user in the conventional manner of a tablet or smartphone touch screen. Touch displays may be black and white or full color.

FIG. 13 visual indicator 830 layout shows the alphabetic homerow (a, s, t, o, u, i, l, m, n, e) from FIG. 4A and modifier labels on the touch display 811 of the keys. These letters and modifiers may indicate specific applications and selections by the user.

The touch displays 811 may be used to distinguish the user selection during the key depression. The modifier touch surface sensors (CAP, WIN, ALT, CTL) are selected by the user fingertip placement. The touch displays 811 may capture the user interaction, with or without activating the electronic detector associated with the key containing the touch surface sensor.

The touch displays may be modified by user interaction with the two-handed keyset. For example, the user's selection of the "CAP" area may cause the display of capital letters. The touch displays may be updated by user interaction with the two-handed keyset. For example, the user's selections of text may be displaying the text on the edge plate touch display 811. The touch displays may indicate the user interaction with the two-handed keyset. For example, the user's fingertip location may be indicated by a triangle indicator on the keys touch display 811. The touch displays may change an audio output as a result of the user interaction with the two-handed keyset. For example, the user's fingertip location may move an indicator on the keys touch display 811, therefore changing the volume of a musical note.

Figure 14A:
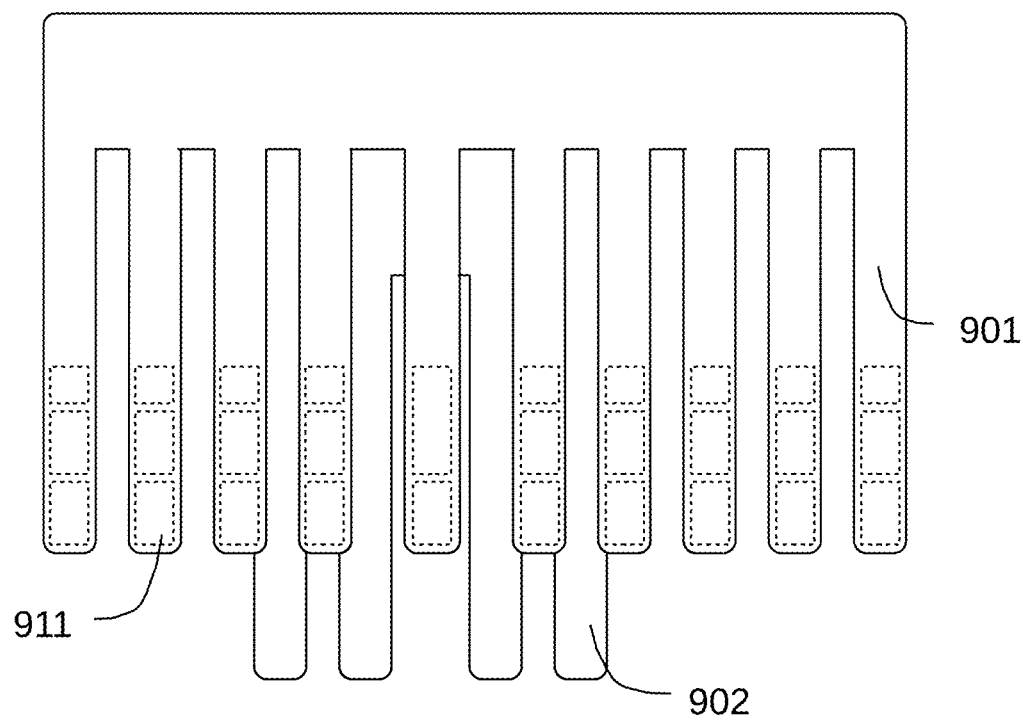
FIG. 14A shows a layout of the two-handed keyset as a stenotype.

FIG. 14A is an embodiment of the two-handed keyset, with a first keyset 901 and second keyset 902, showing a layout with touch surface sensors for a stenotype device. The touch surface sensors 911 are arranged according to a standard layout for a stenograph. The first keyset 901 has ten keys, the edge plate having a dimension of 178 mm (7.0 in) wide, to accommodate ten individual keys having dimensions of 12 mm (0.5 in) wide. The second keyset 902 would have four keys, the edge plate having a dimension of 7 mm (2.7 in) wide, to accommodate four individual keys having dimensions of 12 mm (0.5 in) wide. The first keyset 901 can be placed on top of the second keyset 902 by, for examples, a stand or housing that elevates the first keyset.

Figure 14B:
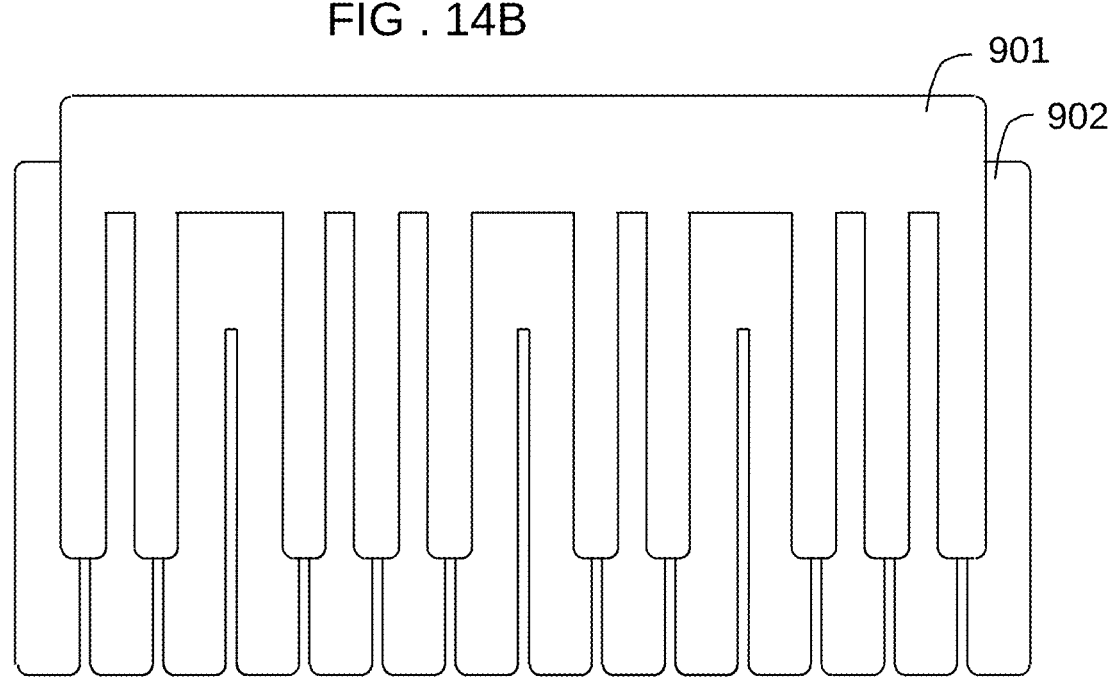
FIG. 14B shows a layout of the two-handed keyset as a musical keyboard.

FIG. 14B is an embodiment of the two-handed keyset, with a top keyset 901 and bottom keyset 902, showing a layout for a piano or other musical keyboard device.

General Operation—When the two-handed keyset is first connected to the computer through the USB cable, the microcontroller initializes settings, timers and connections. After initialization, the microcontroller begins scanning for user interaction. If the initialization is successful, the light emitting diodes (LED) are unlit and if there is an error, the LEDs and the computer alert the user.

On startup, the two-handed keyset is initialized in letter mode. Letter mode has a home row that is the single key selections (a, s, t, u, o, i, n, m, l, e), similar to a conventional keyboard. A conventional keyboard has these ten keys in the home row (a, s, d, f, g, h, j, k, l).

The home row of the two-handed keyset has the vowels (a, e, i, o, u) and common consonants of written English (l, m, n, s, t). The letter order (a, s, t, u, o, i, n, m, l, e) is arranged ergonomically for ease of use and balanced arrangement. The alphabetic arrangement of the two-handed keyset produces letters, with one or two fingers, for easy keying, simple mnemonics and balanced hand usage.

The two-handed keyset defines the home row to allow many common letters to be generated with a single key press. The home row (a, s, t, u, o, i, n, m, l, e) of the two-handed keyset has greater letter frequency (66%) than the home row (a, s, d, f, g, h, j, k, l) of a conventional Qwerty keyboard (34%).

The two-handed keyset uses an alphabetic arrangement that distributes the letters, by frequency of use, to each hand for a balanced ratio (48/52), while a Qwerty keyboard is disproportionately left handed (60/40). A balanced arrangement of the alphabet allows usage with both hands equally and is more ergonomic when compared to a conventional Qwerty keyboard.

Software on the computer is used to receive, display, store, modify and transmit data to and from the two-handed keyset. Software on the computer is used to receive and store the settings of the two-handed keyset. Software on the computer can interconnect with remote users and networks to receive, store, modify and transmit data from or to the two-handed keyset. The two-handed keyset contains software which can be modified through the computer. Software is downloaded to the two-handed keyset for updates or other changes. The update of the software requires the user to activate the updating process on the computer. The software of the two-handed keyset, samples the detectors, evaluates the user interaction and outputs the appropriate codes. The software is specific to the user, the user's language and the application.

The two-handed keyset software provides the user interaction and transmits and receives data. Additional raw data, such as microcontroller conditions, detector conditions and timing, can be transmitted for testing or use. The two-handed keyset software uses timing for detector debounce, key coding, user interaction and interface design.

The user presses the requisite keys on the two-handed keyset for the key code of the desired character or cursor control and which is then transmitted to the computer, producing the character or cursor on the display.

The two-handed keyset defines key codes for letters (a-z), capital letters (A-Z), symbols (!, ?,$, @ . . . etc.), numbers (0-9), control characters (space, backspace, return) and cursor control. The ten keys the two-handed keyset have a maximum of 1023 possible digital combinations. The two-handed keyset uses 100 of the 1023 available keycodes. Additional key codes may be added for applications, languages or other user needs.

Key codes are grouped into five modes, with the letter mode being the default mode. The five modes are letter mode, capital letter mode, symbol mode, number mode and cursor control mode. Modes are useful in distinguishing different character groups, such as letters from numbers, or text generation from text editing, such as letters from control characters. Specifically, modes can provide the user the ability to modify a one hand key code, by using the mode function on the opposite hand.

A home row shows the single key codes of a mode, as if each key is individually pressed. Each home row has key codes and where key codes represent a letter, capital letter, symbol or number, the key code is placed inside a circle.

FIG. 3 shows the letter mode home row 18, capital letter mode home row 19, symbol mode home row 20, number mode home row 21. The home row 22 of the cursor control mode uses icons to represent function and direction of the cursor, with filled icons 28 indicating the left-hand keys and unfilled icons 29 indicating the right-hand keys.

Figure 5:
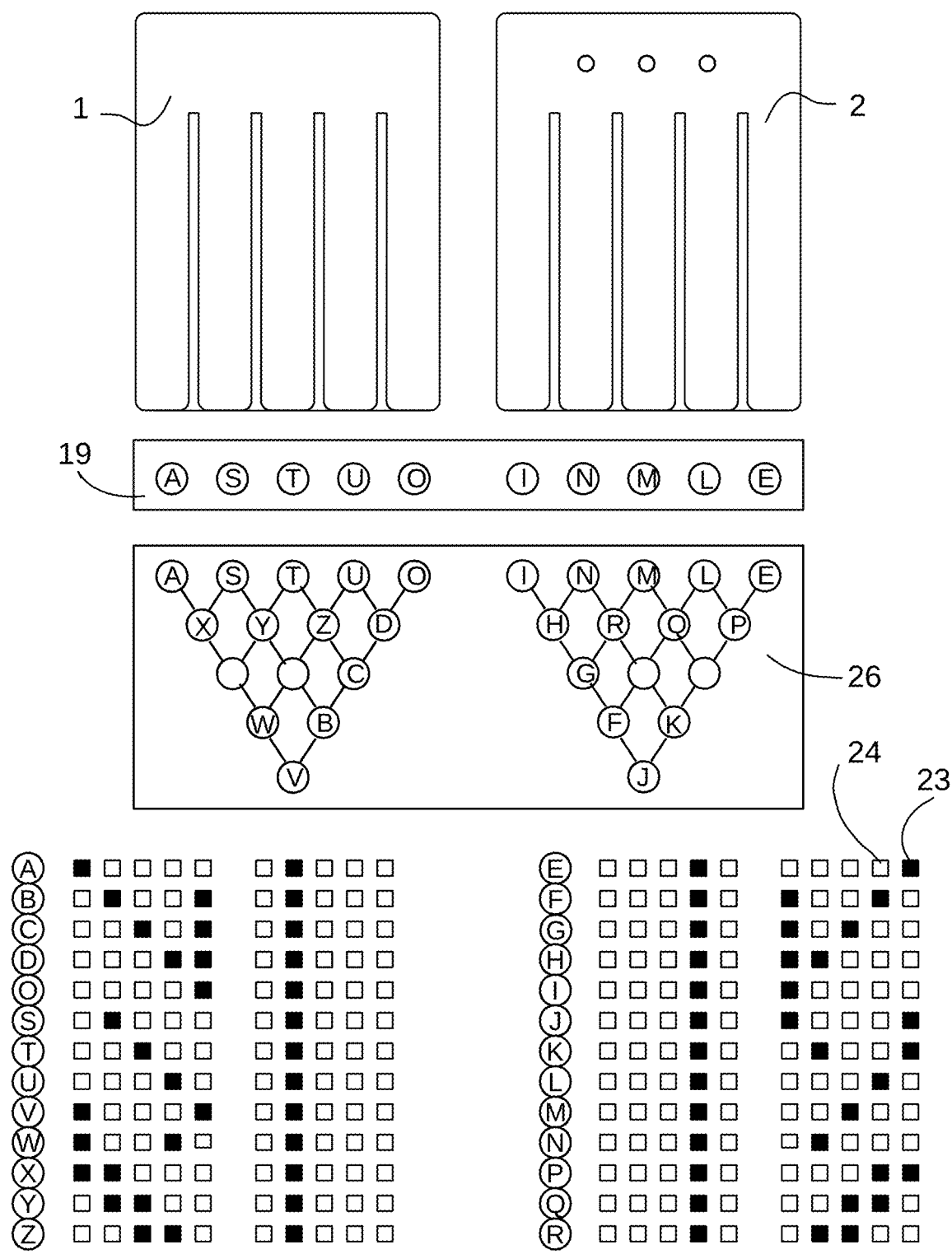
FIG. 5 is a drawing of the pair of keysets, the home row of the capitalized letter mode, the triangular key charts of the key codes for the capitalized letters and the binary pattern of key codes for the capitalized letters.
Figure 6:
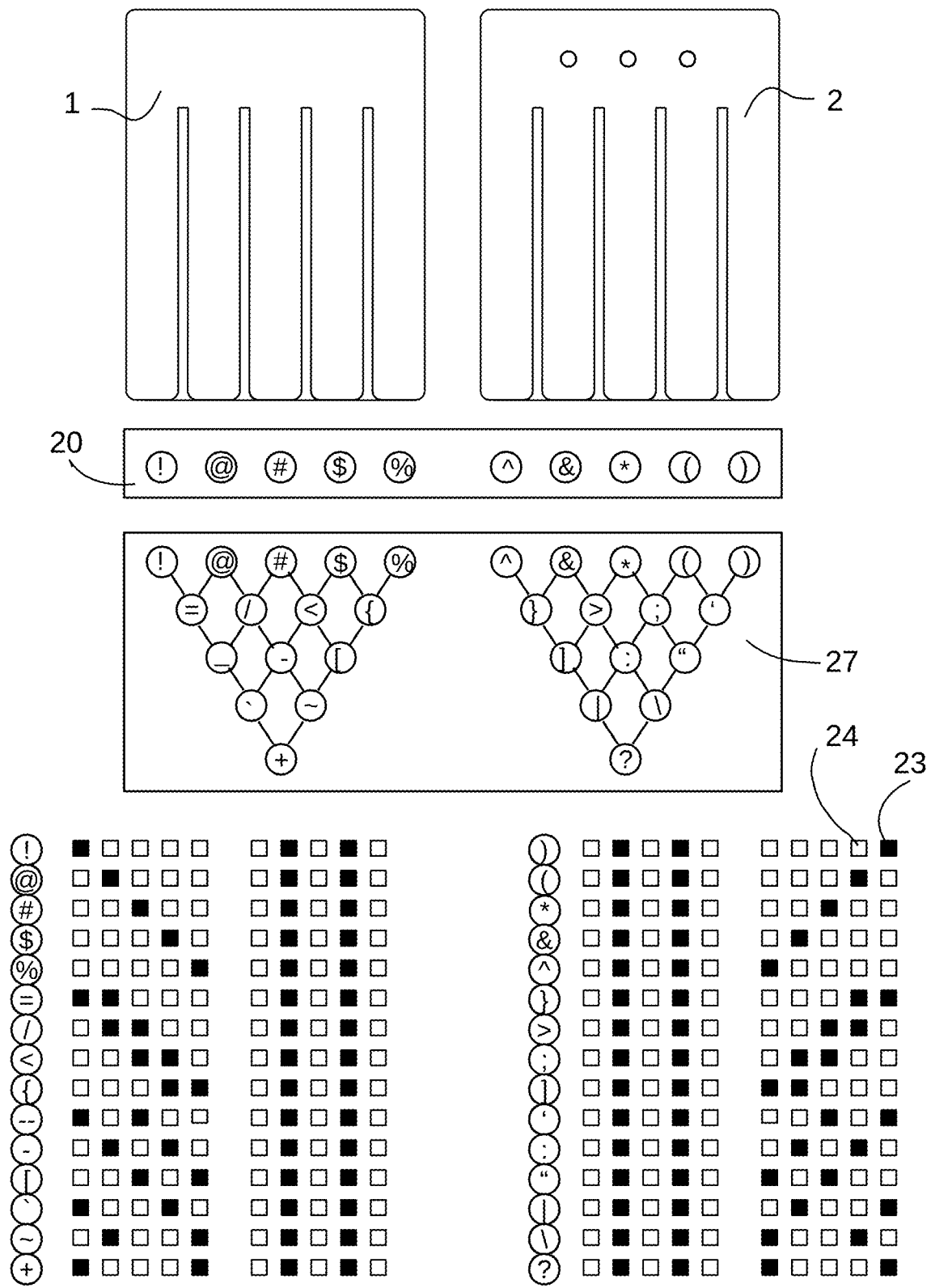
FIG. 6 is a drawing of the pair of keysets, the home row of the symbol mode, the triangular key charts of the key codes for the symbols and the binary pattern of key codes for the symbols.

Triangular key charts have the home row along the top edge and are used to show the additional two key combinations of each hand below. FIG. 4A, FIG. 4B, FIG. 4C, FIG. 4D, and FIG. 4E show the letter key charts 25, FIG. 5 shows the capital letter key charts 26 and FIG. 6 shows the symbol key charts 27.

In FIG. 4A, FIG. 5, FIG. 6, FIG. 7, FIG. 8, and FIG. 9 the key codes are shown as a binary pattern in a horizontal array of ten square boxes, arranged five and five, for left- and right-hand representation. Square boxes are used to depict the detector condition, pressed or un-pressed, as a black square 23 or a white square 24, respectively.

The diagrams of the home row and binary pattern are shown with the drawing of the left- and right-hand keysets to explicate the direct correlation of keys to key codes to binary patterns. The fingering of the ten keys is from left to right (left pinky, left ring, left middle, left index, left thumb, right thumb, right index, right middle, right ring, right pinky).

Figure 7:
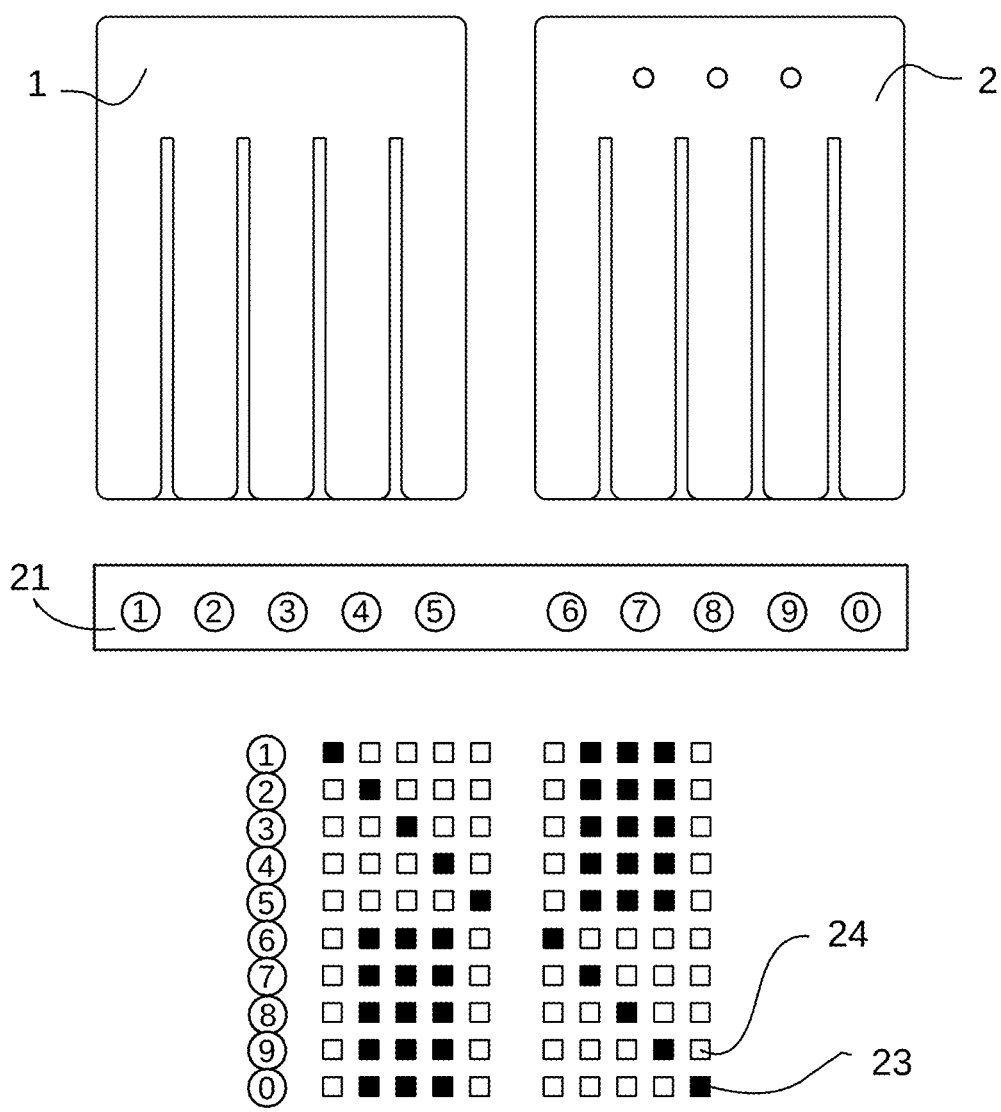
FIG. 7 is a drawing of the pair of keysets, the home row of the number mode and the binary pattern of key codes for the numbers.
Figure 8:
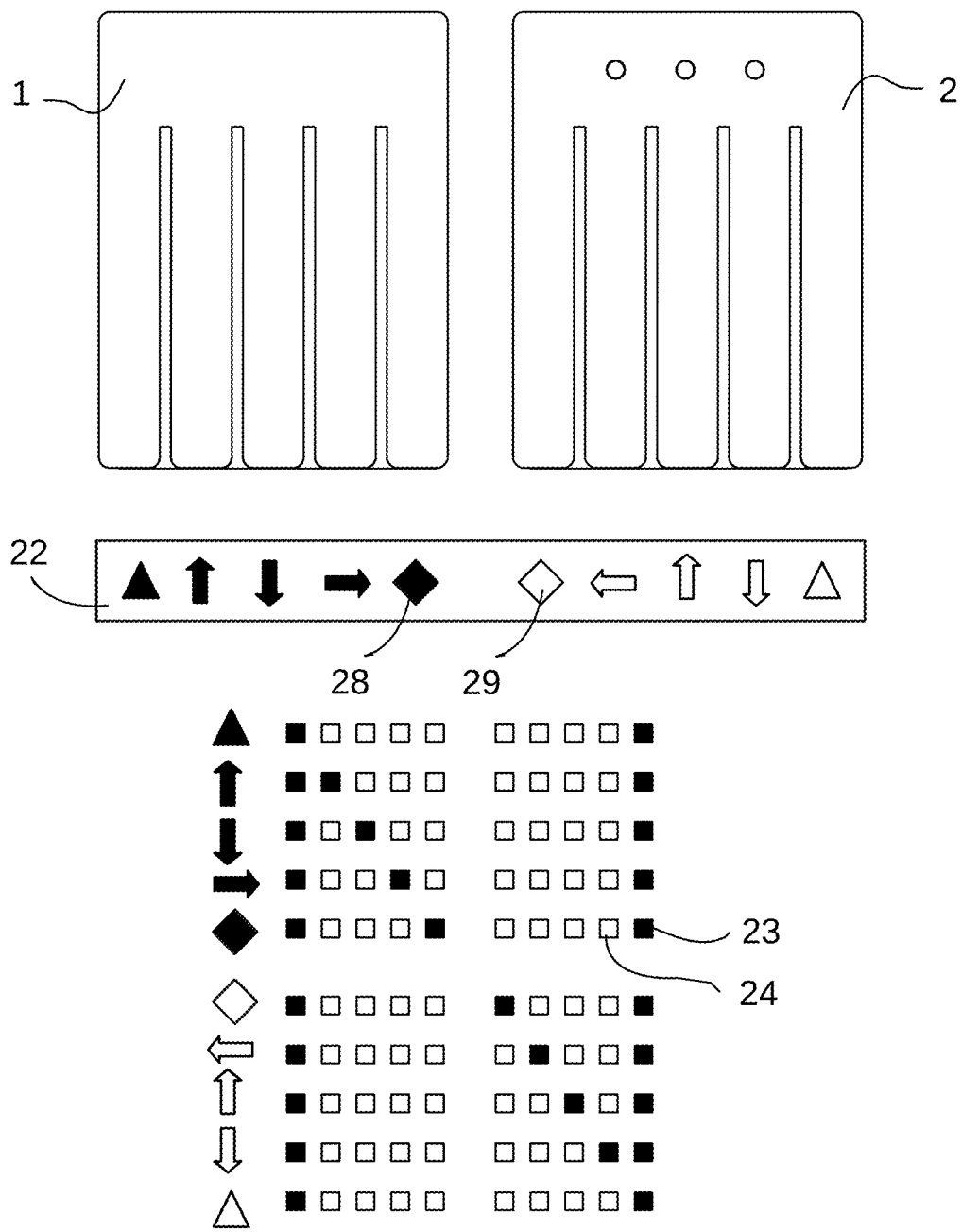
FIG. 8 is a drawing of the pair of keysets, the home row of the cursor control mode and the binary pattern of key codes for the cursor control keys.
Figure 9:
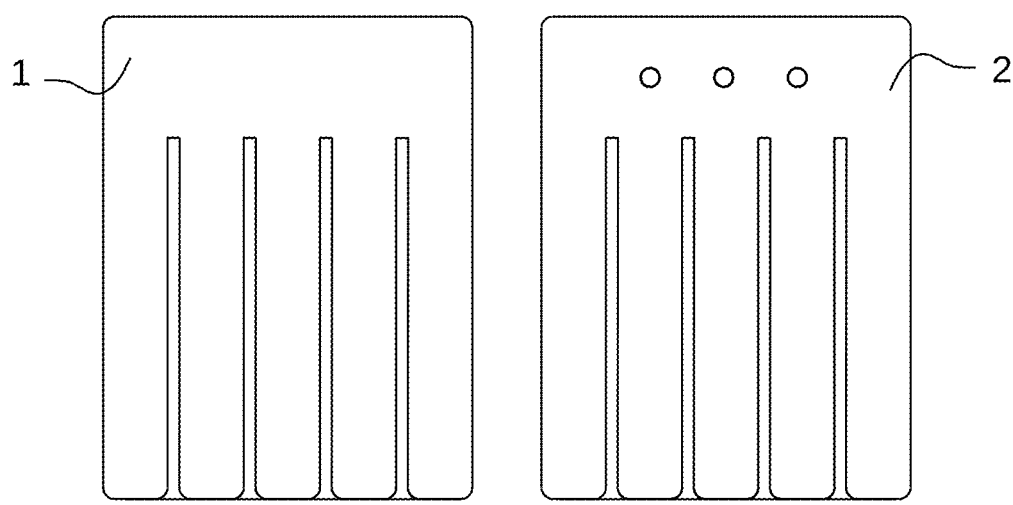
FIG. 9 is a drawing of the pair of keysets and the binary pattern of key codes for Space, Backspace, Return, Comma, Period, Apostrophe and Question Mark.

The letter mode home row 18 with the key charts 25 and binary patterns are shown in FIG. 4A. The key codes for capital letter mode home row 19 with the key charts 26 and binary patterns are shown in FIG. 5. The symbol mode home row 20 with the key charts 27 and binary patterns are shown in FIG. 6. The number mode home row and the binary patterns are shown in FIG. 7. The cursor control home row mode with the binary patterns are shown in FIG. 8. Three control characters and four punctuation characters and their binary patterns are shown in FIG. 9. More specifically, FIG. 9 shows key charts for spacing and punctuation, including space, backspace, return, comma, period, apostrophe and question mark.

Capital letters are produced with a key code for the intended letter on one hand and the index finger of the opposite hand. This allows all letters to be capitalized by addition of a single key, similar to the shift key of a conventional keyboard—see FIG. 5.

Symbols are produced with symbol key codes on one hand and the symbol mode on the opposite hand. The symbol mode uses the index and ring fingers. The symbol home row matches the sequence of the symbol row of a conventional keyboard—see FIG. 6.

Numbers are produced with number key codes on one hand and the number mode on the opposite hand. The number mode uses the index, middle and ring fingers. The number home row matches the sequence of the number row of a conventional keyboard—see FIG. 7.

Modes can be locked to produce multiple characters of the same mode. For example, capital letter mode can be locked to make all subsequent letter capitalized, similar to the caps lock on a conventional keyboard. Modes that are locked, must be unlocked to return to the letter mode. For example, to lock the capital letter mode, press and hold both index finger keys, until the caps lock indicator is illuminated. To unlock the capital letter mode, press and hold both index finger keys, until the caps lock indicator is not illuminated.

To lock the symbol mode, press and hold the index and ring finger keys, until the symbol lock indicator is illuminated. To unlock the symbol mode on the two-handed keyset, press and hold the index and ring finger keys, until the symbol lock indicator is not illuminated.

To lock the number mode, press and hold the index, middle and ring finger keys, until the number lock indicator is illuminated. To unlock the number mode on the two-handed keyset, press and hold the index, middle and ring finger keys, until the number lock indicator is not illuminated.

Additional key codes for a single finger on each hand produces easy key combinations that are commonly used while generating and editing text. For example, the space key code is produced by selecting the left and right thumb keys. The binary representation of each additional key code (space, backspace, return, comma, period, apostrophe, question mark) is shown in FIG. 9.

Cursor control mode is activated by pressing and holding the left and right pinky finger keys. The cursor control is active while both keys are held down. Release the pinky finger keys to deactivate the cursor control mode and return to the letter mode. Cursor control mode causes the two-handed keyset to emulate a mouse. See FIG. 8 The two-handed keyset cursor control uses separate keys for up, down, left and right to emulate mouse functions. Cursor control can be used to navigate and edit text documents in a windowed environment similar to a mouse.

The two-handed keyset cursor control uses the index and middle finger keys of both hands to generate the X-axis and Y-axis movement of the cursor on the computer display. For example, while in cursor control mode, pressing the right index finger key produces movement of the cursor to the left on the display.

The left and right thumb keys emulate the left and right buttons of standard two button mouse. For example, while in cursor control mode, pressing the right thumb key sends the code for a right button down on a mouse. The left and right ring finger keys produce the codes for scrolling up and down, respectively. For example, while in cursor control mode, pressing the right ring finger key scrolls down.

To lock the cursor control mode, press and hold all pinky and ring finger keys until the three LED indicators are illuminated. The cursor control mode is active until being unlocked. To unlock the cursor control mode, press and hold all pinky and ring finger keys until all three LED indicators are not illuminated.

Using the cursor control mode, menus can be opened and selected. Software on the computer provides additional controls, menus and characters. Rate of speed of the cursor, mouse button usage and other mouse functions can be set.

The two-handed keyset has three LEDs, the Caps Lock indicator 15, the Symbol Lock indicator 16 and the Number Lock indicator 17. as shown in FIG. 2. The LEDs are used to visually display the locked modes of the two-handed keyset, similar to the caps lock or number lock indicators on conventional keyboards. Letter mode has no illuminated LEDs. Cursor control lock illuminates all three LEDs.

Alternative embodiments of the two-handed keyset may be organized by the user's needs or by the application. The user's anatomy, size and ability may be a factor in the shape, size and function of the two-handed keyset. The user's language and vocabulary may be factors in the coding and function of the two-handed keyset.

Alternative embodiments of the two-handed keyset may use specific methods to optimize for speed, efficiency and ease of data generation. For instance, if the usage is for informal text generation, capital letters may be unused.

Alternative embodiments of the two-handed keyset may include specific codes for different languages or application including, but not limited to glyphs, emojis, letters, numbers, icons, control characters and ideograms.

Alternative embodiments of the two-handed keyset can generate codes for alphabets and characters specific to a user's language. For example, the Japanese Hiragana with 46 base characters may be coded by the two-handed keyset with single keys for the vowels on the left hand and multiple keys for the consonants on the right hand.

Alternative embodiments of the two-handed keyset may include setting of additional modes for specific users or applications. For instance, if editing a user musical score, the two-handed keyset may switch to a musical notation mode and appropriate cursor control.

Alternative embodiments of the two-handed keyset may employ musical notations. For example, the two-handed keyset may be developed for musical purposes such as producing notes.

Alternative embodiments of the two-handed keyset may employ phonetic notations. For example, the two-handed keyset may be developed for stenographic purposes.

Alternative embodiments of the two-handed keyset may modify its physical construction including, but not limited to, shape, size or material. For example, the two-handed keyset may use different materials in construction for use in harsh environments, including waterproof and scratchproof materials.

Alternative embodiments of the two-handed keyset may be for portable use by folding or collapsing from the normal size to a smaller size and may reduce the weight through material changes.

Alternative embodiments of the two-handed keyset designs may be for portable use, utilizing battery power and recharging circuits and additional electronics.

Alternative embodiments of the two-handed keyset may use additional sensors, including but not limited to, orientation sensors, proximity sensors, touch sensors and drop sensors. For example, key position and velocity may captured by sensors.

Alternative embodiments of the two-handed keyset may have adjustable keys for specific users or uses. For example, each key may be adjusted for the range of motion and position to match a user's hand shape.

Alternative embodiments of the keys may include, but is not limited to, wider keys, more flexible keys and illuminated keys. For example, the keys may be arranged in order to reduce hand fatigue for users with less manual dexterity.

Alternative embodiments of the keys may include, but is not limited to, capacitive sensors, pressure sensors and flex sensors. For example, sensors may capture fingertip position or fingertip pressure.

Alternative embodiments of the two-handed keyset may utilize feedback including, but not limited to, audible and haptic feedback. For example, the keys may have tactile bumps for locating fingertips on the keys precisely.

Alternative embodiments of the two-handed keyset may use radio frequencies for use with Bluetooth, Wi-Fi or other wireless standard for the connection to a computer or network.

The two-handed keyset may have alternative embodiments as a HID for specific computer applications, specific user applications, specific environments and specific user. For example, the two-handed keyset may emulate a joystick, game controller or other HID.

Alternative embodiments of the two-handed keyset may be as a cursor controller used for specific computer applications, such as "point of view" in 3D CAD applications or "navigation" in immersive environments or virtual spaces.

Alternative embodiments of the two-handed keyset may include error correction software.

Alternative embodiments of the two-handed keyset may use timed user actions including, but not limited to, long and short key presses.

Alternative embodiments of the two-handed keyset can analyze sequential key presses to determine user intent, define key code or other use.

Alternative embodiments of the two-handed keyset may be developed for single handed use.

Alternative embodiments of the two-handed keyset may enter sleep modes when not used and can be re-activated to leave sleep mode.

Alternative embodiments of the two-handed keyset designs may be graphically distinct by use of color, text and graphics. For example, the key codes may be inscribed on the keyplate.

Alternative embodiments of the two-handed keyset may include, but is not limited to, use for password input, entry codes or other authentication methods.

Alternative embodiments of the two-handed keyset can include, but is not limited to, use by multiple users, networked use or other collaborative functions. For example, the two-handed keyset may be used for multi-player games.

Alternative embodiments of the two-handed keyset may include, but not limited to, use with applications on smart phones, laptop computers and tablets.

Alternate embodiments of the two-handed keyset may be as a virtual keyset on the touch screen of tablets or smartphones. For example, a two-handed keyset tutorial may be available on other devices Alternative embodiments of the two-handed keyset may allow automatic updates of the software.

Alternative embodiments of the two-handed keyset may include additional key codes, including but not limited to, Cut, Copy, Paste, arrow keys, page up and page down.

A number of alternatives, modifications, variations, or improvements therein may be subsequently made by those skilled in the art, which are also intended to be encompassed by the following claims.

The invention claimed is:

1. A two-handed keyset device comprising:
 a first keyset comprising:
  a first keyplate comprising a plurality of keys connected to an edge plate, the individual keys being attached to the edge plate by their respective top edges, the keys being capable of deflecting independently from each other; and
  a plurality of electronic detectors, wherein each electronic detector is functionally coupled to a key of the first keyplate such that the electronic detector is activated when the key is pressed;
 a second keyset comprising:
  a second keyplate comprising of a plurality of keys connected to an edge plate, the individual keys being attached to the edge plate by their respective top edges, the keys being capable of deflecting independently from each other; and
  a plurality of electronic detectors, wherein each electronic detector is functionally coupled to a key of the second keyplate such that the electronic detector is activated when the key is pressed; and
 a communication tether configured to electronically connect the first keyset and second keyset.

2. The two-handed keyset device of claim 1 wherein the electronic detectors comprise mechanical switches, and each detector produces an on or off signal.

3. The two-handed keyset device of claim 1 wherein the electronic detectors comprise pressure sensors, and each detector produces a signal proportional to the pressure applied to the key.

4. The two-handed keyset device of claim 1 wherein the electronic detectors comprise distance sensors and each detector produces a signal proportional to the depth that a key travels when pressed.

5. The two-handed keyset device of claim 1 wherein the electronic detectors comprise capacitive sensors, and each detector produces a signal for an area on the key surface.

6. The two-handed keyset device of claim 1 wherein the electronic detectors comprise linked capacitive sensors, and each detector produces a signal proportional to the location along the key surface.

7. The two-handed keyset device of claim 1 wherein the communication tether configured to electronically connect the first keyset and second keyset comprises a wired connection between the first and second keysets such that a physical tether connects the two keysets.

8. The two-handed keyset device of claim 1 wherein the communication tether configured to electronically connect first keyset and second keyset comprises a wireless receiver that receives signals from the first keyset and the second keyset wirelessly.

9. The two-handed keyset device of claim 1 wherein the first keyset further comprises a first base for mounting the first keyplate and plurality of electronic detectors, and the second keyset further comprises a second base for mounting the second keyplate and plurality of electronic detectors.

10. The two-handed keyset device of claim 1 wherein the communication tether configured to electronically connect the first keyset and second keyset facilitates two-way communication between the first keyset and the second keyset so to enable certain selectable modes to be recognizable to both keysets.

11. The two-handed keyset device of claim 1 wherein at least a portion of the keys comprise a touch display.

12. The two-handed keyset device of claim 11 wherein the touch display is a flexible touch display.

13. The two-handed keyset device of claim 1 wherein a series of touch surface sensors are affixed to the top surface of at least one key, the touch surface sensors being arranged serially along the length of the key and being configured to detect touch surface changes on the surface of the key upon contact.

14. The two-handed keyset device of claim 1 wherein the communication tether connecting the first keyset and the second keyset is part of a computer network.

15. A computer system comprising:
the two-handed keyset device of claim 1;
a computer;
a network; and
an output device connected to the computer, the output device configured to provide at least one of audio and visual output;
wherein at least one of the first keyset and the second keyset is connected to the computer through the network, whereby the computer receives input from the first keyset and second keyset.

16. The computer system of claim 15 wherein the communication tether configured to electronically connect the first keyset and second keyset comprises a wired connection between the first and second keysets such that a physical tether connects the two keysets.

17. The computer system of claim 15 wherein the communication tether configured to electronically connect first keyset and second keyset comprises a wireless receiver that receives signal from the first keyset and the second keyset wirelessly.

18. A method of making a two-handed keyset comprising:
forming a first flexible keyplate by cutting at least two slots extending from one edge of a sheet of flexible material, each slot extending at least one-third of the way across the length of the sheet, creating keys cantilevered from the first edge plate;
forming a second flexible keyplate by cutting at least two slots extending from one edge of a sheet of flexible material, each slot extending at least one-third of the way across the length of the sheet, creating keys cantilevered from the second edge plate;
forming a flat surface onto a block of rigid material to form a first base;
forming a flat surface onto a block of rigid material to form a second base;
attaching electronic detectors onto at least one of the surfaces of the keys of the first keyset and the flat surface of the first base under the keys, such that an electronic detector is activated when a key is pressed;
attaching electronic detectors onto at least one of the surfaces of the keys of the second keyset and the flat surface of the second base under the keys such that an electronic detector is activated when a key is pressed;
configuring a communication tether to connect the electronic detectors of the first keyset and second keyset; and
attaching the first keyplate onto the first base containing electronic detectors creating the first keyset and attaching the second keyplate onto the second base containing electronic detectors creating the second keyset.

19. A method of providing command to a computer comprising:
pressing on a first key on a first keyset comprising:
a first keyplate comprising of a plurality of keys connected to an edge plate, the individual keys being attached to the edge plate by their respective top edges, the keys being capable of deflecting independently from each other; and
a plurality of electronic detectors, wherein each electronic detector is functionally coupled to a key of the first keyplate such that the electronic detector is activated when the key is pressed;
pressing on a second key on a second keyset comprising:
a second keyplate comprising of a plurality of keys connected to an edge plate, the individual keys being attached to the edge plate by their respective top edges, the keys being capable of deflecting independently from each other; and
a plurality of electronic detectors, wherein each electronic detector is functionally coupled to a key of the second keyplate such that the electronic detector is activated when the key is pressed; and
interpreting the electronic signals from the first keyset and second keyset by a microprocessor and attached electronics into a computer command that is unique from either pressing the first key only or pressing the second key only.

* * * * *